US011209837B2

(12) United States Patent
Huang et al.

(10) Patent No.: US 11,209,837 B2
(45) Date of Patent: Dec. 28, 2021

(54) METHOD AND DEVICE FOR GENERATING A MODEL OF A TO-BE RECONSTRUCTED AREA AND AN UNMANNED AERIAL VEHICLE FLIGHT TRAJECTORY

(71) Applicant: MOUTONG SCIENCE AND TECHNOLOGY CO., LTD, Guangdong (CN)

(72) Inventors: Hui Huang, Guangdong (CN); Xiaohui Zhou, Guangdong (CN)

(73) Assignee: MOUTONG SCIENCE AND TECHNOLOGY CO., LTD., Guangdong (CN)

( * ) Notice: Subject to any disclaimer, the term of this patent is extended or adjusted under 35 U.S.C. 154(b) by 55 days.

(21) Appl. No.: 16/656,354

(22) Filed: Oct. 17, 2019

(65) Prior Publication Data
US 2021/0026377 A1 Jan. 28, 2021

(30) Foreign Application Priority Data
Jul. 26, 2019 (CN) .......................... 201910683004.7

(51) Int. Cl.
*G06K 9/00* (2006.01)
*G05D 1/10* (2006.01)
(Continued)

(52) U.S. Cl.
CPC ........... *G05D 1/106* (2019.05); *B64C 39/024* (2013.01); *B64D 47/08* (2013.01); *G01S 19/45* (2013.01);
(Continued)

(58) Field of Classification Search
None
See application file for complete search history.

(56) References Cited

U.S. PATENT DOCUMENTS 10,642,284 B1 * 5/2020 Barazovsky ............ G01S 19/15
2012/0293505 A1 * 11/2012 Meadow .................. G06F 16/58
345/419
(Continued)

FOREIGN PATENT DOCUMENTS

| CN | 108981706 A | 12/2018 |
|---|---|---|
| CN | 109447326 A | 3/2019 |
| CN | 109447371 A | 3/2019 |

OTHER PUBLICATIONS

Wan et al., "Illumination-invariant image matching for autonomous UAV localisation based on optical sensing", ISPRS Journal of Photogrammetry and Remote Sensing 119 (2016), pp. 198-213.*
(Continued)

*Primary Examiner* — Guillermo M Rivera-Martinez
(74) *Attorney, Agent, or Firm* — Brandon V. Zuniga; James R. Gourley; Carstens & Cahoon, LLP

(57) ABSTRACT

A method for generating a UAV flight trajectory. The method includes acquiring map data of a to-be-reconstructed area; the map data includes a satellite map image and a plane map image; acquiring building silhouettes of each building in a to-be-reconstructed area from a plane map image; acquiring height data of each building from a satellite map image; generating an initial model according to the building silhouettes and height data of each building; determining a view set according to an initial model; generating a flight trajectory from a view set. The initial model can be established without pre-flight of the to-be-reconstructed area, and the UAV flight trajectory can be directly generated, so that the calculation amount of data is reduced.

17 Claims, 15 Drawing Sheets

(51) Int. Cl.

| | |
|---|---|
| *G06T 7/507* | (2017.01) |
| *G06T 7/12* | (2017.01) |
| *G06T 7/174* | (2017.01) |
| *B64C 39/02* | (2006.01) |
| *B64D 47/08* | (2006.01) |
| *G01S 19/45* | (2010.01) |
| *G06T 17/05* | (2011.01) |

(52) U.S. Cl.
CPC ............. *G06T 7/12* (2017.01); *G06T 7/174* (2017.01); *G06T 7/507* (2017.01); *G06T 17/05* (2013.01); *B64C 2201/145* (2013.01); *G06T 2207/10032* (2013.01); *G06T 2215/12* (2013.01)

(56) References Cited

U.S. PATENT DOCUMENTS

| | | | | |
|---|---|---|---|---|
| 2014/0316616 | A1* | 10/2014 | Kugelmass | G06T 11/206 701/8 |
| 2015/0347872 | A1* | 12/2015 | Taylor | G06K 9/00637 382/224 |
| 2016/0004795 | A1* | 1/2016 | Novak | G06F 30/20 703/1 |
| 2016/0277661 | A1* | 9/2016 | Brav | H04N 5/23293 |
| 2016/0292872 | A1* | 10/2016 | Hammond | G06K 9/52 |
| 2016/0307447 | A1* | 10/2016 | Johnson | B60L 58/12 |
| 2017/0039765 | A1* | 2/2017 | Zhou | G06T 7/55 |
| 2017/0206648 | A1* | 7/2017 | Marra | G01C 21/20 |
| 2018/0025650 | A1* | 1/2018 | Taveira | B64C 39/024 701/3 |
| 2019/0042829 | A1* | 2/2019 | Loveland | G06K 9/00637 |
| 2019/0145778 | A1* | 5/2019 | Huang | G01C 21/20 701/3 |
| 2020/0019752 | A1* | 1/2020 | Frei | B64D 47/08 |
| 2020/0195847 | A1* | 6/2020 | Zheng | B64C 39/024 |
| 2020/0202616 | A1* | 6/2020 | Yu | G06T 7/32 |
| 2020/0255143 | A1* | 8/2020 | Liang | G06T 17/05 |
| 2020/0288329 | A1* | 9/2020 | Priest | G05D 1/0094 |
| 2020/0324896 | A1* | 10/2020 | Noura | B64C 27/08 |

OTHER PUBLICATIONS

Govindaraju et al, "Visibility-based UAV path planning for surveillance in cluttered environments", 2014 IEEE International Symposium on Safety, Security, and Rescue Robotics (2014), 2014, pp. 1-6, doi: 10.1109/SSRR.2014.7017660.*

Office Action for Chinese Application No. 201910683004.7 dated Aug. 18, 2021 (7 pages).

* cited by examiner

FIG. 9a

FIG. 9b

FIG. 9c

FIG. 9d

902 — PERFORMING A SHADOW DETECTION PROCESSING ON THE SATELLITE MAP IMAGE TO OBTAIN A SHADOW PROBABILITY IMAGE, A GRAY VALUE OF A PIXEL POINT IN THE SHADOW PROBABILITY IMAGE REPRESENTS A PROBABILITY THAT THE PIXEL POINT IS IN SHADOW

904 — PERFORMING AN AREA SEGMENTATION PROCESSING ON THE SATELLITE MAP IMAGE TO OBTAIN AN AREA SEGMENTATION IMAGE

906 — ACQUIRING A SHADOW BINARIZED IMAGE ACCORDING TO THE AREA SEGMENTATION IMAGE AND THE SHADOW PROBABILITY IMAGE, THE SHADOW BINARIZED IMAGE DISPLAYING A SHADOW AREA IN THE SATELLITE MAP IMAGE

FIG. 10

METHOD AND DEVICE FOR GENERATING A MODEL OF A TO-BE RECONSTRUCTED AREA AND AN UNMANNED AERIAL VEHICLE FLIGHT TRAJECTORY

CROSS REFERENCE TO RELATED APPLICATIONS

The present disclosure claims priority to the Chinese application No. 2019106830047, titled "method and device for generating an unmanned aerial vehicle flight trajectory, computer apparatus and storage medium", filed on Jul. 26, 2019. Afore-mentioned references are herein incorporated by reference in their entireties.

TECHNICAL FIELD

The present disclosure relates to the technical field of data processing, particularly a method and a device for generating an unmanned aerial vehicle flight trajectory, a computer apparatus and a storage medium for generating an unmanned aerial vehicle flight trajectory.

BACKGROUND

Scene modeling has become a core part of navigation, simulation, and virtual reality applications. Although detailed models can be obtained using interactive software, they do not apply to large-scale urban scenarios. With the rapid development of unmanned aerial vehicle (hereinafter UAV) technology in recent years, the manufacture and use cost of a UAV is low, the maneuverability is strong, and UAV can be used in many occasions. These characteristics make it possible to reconstruct large-scale outdoor scenes by taking photos from a UAV.

UAV photo reconstruction technology is divided into two types: the preset mode and the adaptive mode. In the preset mode type, such as commercial applications of Altizure and DJI-Terra, the adjustable parameters are single, the complexity of the environment and the distribution of the buildings in the scene are not taken into consideration, such that the reconstruction result is not complete. For the adaptive mode type, a two-step strategy is adopted, which needs flying twice to the reconstruction area: a first time to use the predefined mode to pre-fly the scene, to collect the photos and reconstruct the rough geometry agent; and a second time to generate a new planned path according to the geometry agent guidance. Two flights require a long-time data collection and a high computational power for outdoor operations.

SUMMARY

In view of the above technical problems, it is necessary to provide a method, and a device for generating a UAV flight trajectory, and a computer apparatus and a storage medium to reduce on-site operation time and data calculation amount.

A method for generating a UAV flight trajectory, the method includes:

acquiring map data of a to-be-reconstructed area, the map data including a satellite map image and a plane map image;

acquiring building silhouettes corresponding to each of buildings in the to-be-reconstructed area according to the plane map image;

acquiring height data corresponding to each of the buildings according to the satellite map image;

generating an initial model according to the building silhouettes and the height data corresponding to each of the buildings;

determining a view set according to the initial model, the view set including a plurality of views when a UAV photographs the to-be-reconstructed area; and generating a flight trajectory according to the view set.

A computer apparatus, including: one or more processors, and a memory storing computer-readable instructions which, when executed by the one or more processors cause the one or more processors to perform steps of:

acquiring map data of a to-be-reconstructed area, the map data including a satellite map image and a plane map image;

acquiring building silhouettes corresponding to each of buildings in the to-be-reconstructed area according to the plane map image;

acquiring height data corresponding to each of the buildings according to the satellite map image;

generating an initial model according to the building silhouettes and the height data corresponding to each of the buildings;

determining a view set according to the initial model, the view set including a plurality of views when a UAV photographs the to-be-reconstructed area; and generating a flight trajectory according to the view set.

One or more non-transitory computer-readable storage medium storing computer-executable instructions that, when executed by one or more processors, cause the one or more processors to perform the steps of:

acquiring map data of a to-be-reconstructed area, the map data including a satellite map image and a plane map image;

acquiring building silhouettes corresponding to each of buildings in the to-be-reconstructed area according to the plane map image;

acquiring height data corresponding to each of the buildings according to the satellite map image;

generating an initial model according to the building silhouettes and the height data corresponding to each of the buildings;

determining a view set according to the initial model, the view set including a plurality of views when a UAV photographs the to-be-reconstructed area; and generating a flight trajectory according to the view set.

According to the method and device for generating a UAV flight trajectory, computer apparatus, and storage medium provided by embodiments of the present disclosure, an initial model of a to-be-reconstructed area is generated through map data, and a view set is generated through the initial model. In addition, the UAV flight trajectory is obtained. The initial model can be established without pre-flight of the to-be-reconstructed area, and based on the initial model. The UAV flight trajectory can be directly generated, the data calculation amount is reduced, and the calculation time is reduced. Also, the outdoor operation time is reduced, and the operation efficiency is improved.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

FIGS. 9a-9d are schematic diagrams of map images provided by some exemplary embodiments.

FIG. 10 is a flowchart of a method for generating a UAV flight trajectory according to an exemplary embodiment.

DETAILED DESCRIPTION OF THE EMBODIMENTS

The present disclosure will be described in details in combination with the accompanying drawings and embodiments such that the purpose, technical solution and advantages of the present disclosure will be more apparent. It should be understood that the particular embodiments are described for the purpose of illustrating as opposed to restricting the present disclosure.

Figure 1:
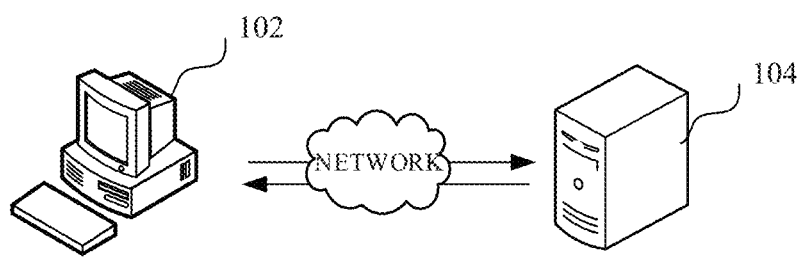
FIG. 1 illustrates an implementation environment diagram of a method for generating a UAV flight trajectory according to an exemplary embodiment.

The present disclosure provides a method for generating a UAV flight trajectory, which can be applied to an application environment as shown in FIG. 1. The terminal 102 communicates with the server 104 through a network. The terminal 102 may be selected from, but is not limited to, a variety of personal computers, notebook computers, smart-phones, tablet computers, and portable wearable devices. The server 104 may be implemented as a stand-alone server or as a cluster of servers composed of multiple servers.

Figure 2:
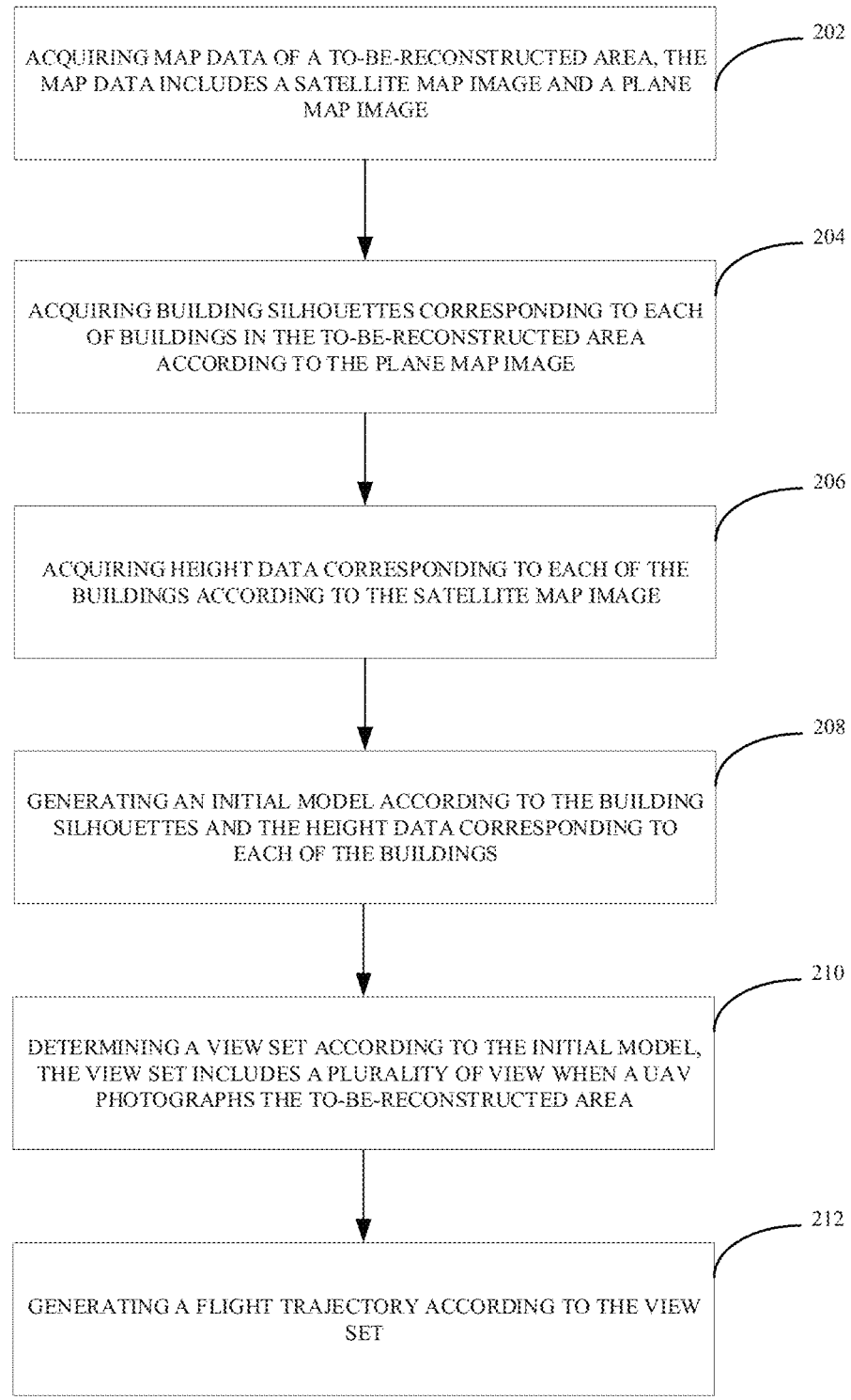
FIG. 2 is a flowchart of a method for generating a UAV flight trajectory according to an exemplary embodiment.

Referring to FIG. 2, it shows a method for generating a UAV flight trajectory according to this embodiment, which is applied to the terminal 102 in FIG. 1 as an example, and includes the following steps:

At step 202: acquiring map data of a to-be-reconstructed area. The map data includes a satellite map image and a plane map image.

In an exemplary embodiment of the present disclosure, a user may make a frame selection of a to-be-reconstructed area in a satellite map image or a plane map image through an interactive interface of the terminal 102. After the user selects the to-be-reconstructed area, the terminal 102 sends a map data requesting message to a database storing map data or a third-party server, and obtains a satellite map image and a plane map image corresponding to the to-be-reconstructed area.

At step 204: acquiring building silhouettes corresponding to each of buildings in the to-be-reconstructed area according to the plane map image.

Specifically, the plane map image includes different color blocks, and building silhouettes corresponding to each building in the to-be-reconstructed area are determined according to the correspondence between the color blocks and the actual objects in the map. For example, the white area represents the area where the building is located, and the green area represents the area where plants are grown. By identifying the area silhouettes of the white area, the corresponding building silhouettes of each building can be approximated.

At step 206: acquiring height data corresponding to each of the buildings according to the satellite map image.

In an exemplary embodiment of the present disclosure, the satellite map image reflects a real image of the to-be-reconstructed area, including a top view of the to-be-reconstructed area. By acquiring the shadow lengths of each building, the height data of each building is obtained in accordance with the correspondence between the shadow lengths and the buildings.

At step 208: generating an initial model according to the building silhouettes and the height data corresponding to each of the buildings.

In an exemplary embodiment of the present disclosure, in a three-dimensional space, the ground of the to-be-reconstructed area is regarded as an X-Y plane, and the building model is obtained by longitudinally stretching the building silhouettes according to a corresponding height along the Z-axis. The initial model is a combination of the building model and the ground of the to-be-reconstructed area.

At step 210: determining a view set according to the initial model. The view set includes a plurality of views when a UAV photographs the to-be-reconstructed area.

In an exemplary embodiment of the present disclosure, a plurality of views may be set, according to the generated initial model, around the initial model in the three-dimensional space so that the UAV can photograph the to-be-reconstructed area through the plurality of views, so as to reconstruct buildings in the to-be-reconstructed area according to a plurality of captured images. Specifically, each view includes position information and direction information in the three-dimensional space.

At step 212: generating a flight trajectory according to the view set.

In an exemplary embodiment of the present disclosure, the determined view set includes a plurality of views. A flight trajectory needs to be established when the UAV is photographing the to-be-reconstructed area through the plurality of views, such that the flight trajectory can sequentially connect each view.

Optionally, a cost function is constructed according to distance and angle variation for multiple views in the view set, and an optimal flight trajectory is generated by the travelling salesman problem algorithm.

According to the method for generating a UAV flight trajectory provided by some exemplary embodiments of the present disclosure, an initial model of a to-be-reconstructed area is generated through map data, and a view set is generated through the initial model, thereby acquiring the UAV flight trajectory. The initial model can also be established without pre-flight of the to-be-reconstructed area. And based on the initial model, the UAV flight trajectory can be directly generated, thereby reducing the data calculation amount and the calculation time. Also, the outdoor operation time is reduced, and the operation efficiency is improved.

Figure 3:
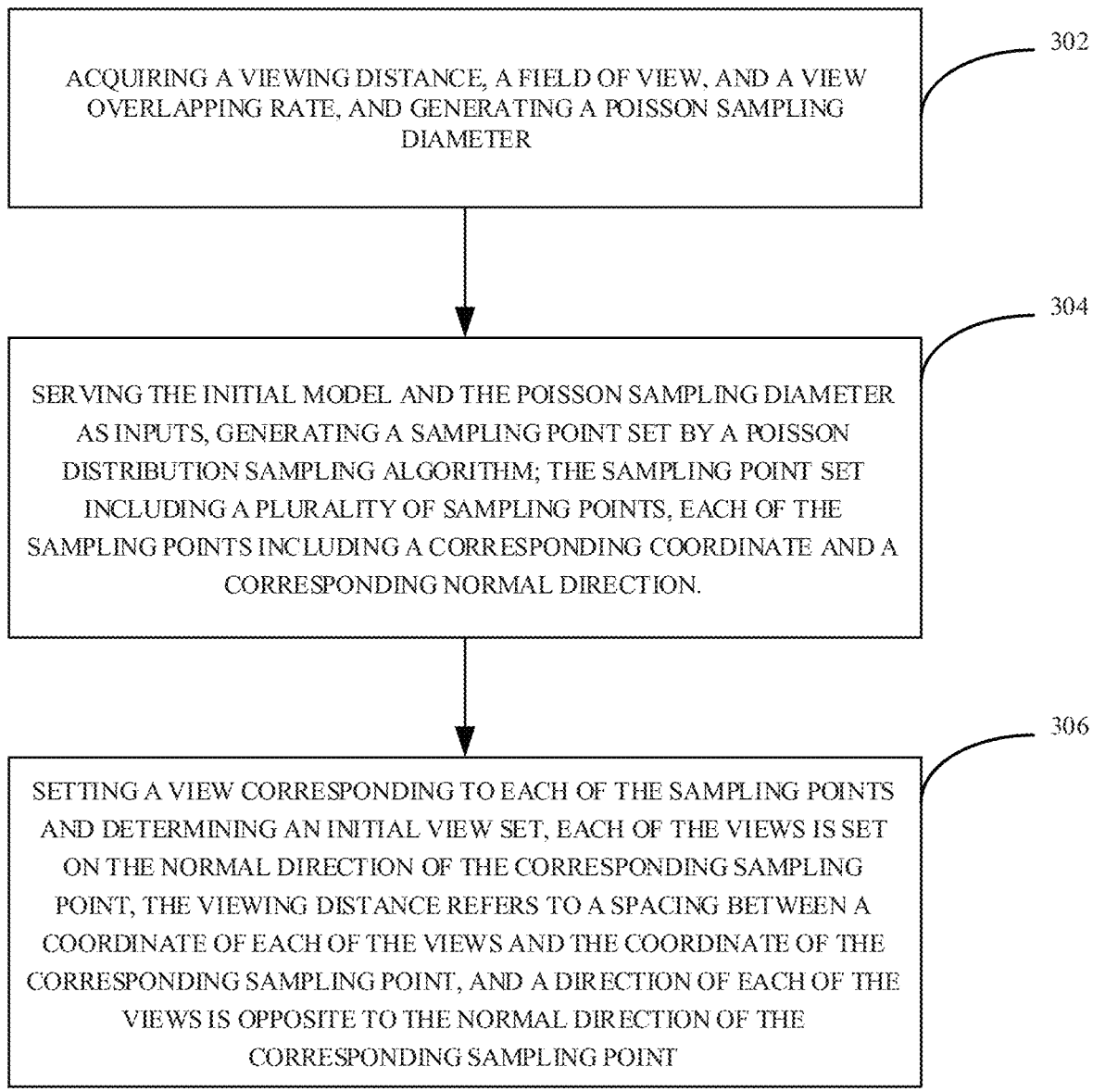
FIG. 3 is a flowchart of a method for generating a UAV flight trajectory according to an exemplary embodiment.

Referring to FIG. 3, a flowchart of a method for generating a UAV flight trajectory according to an exemplary embodiment is shown. It can be applied to the terminal 102 in the described implementation environment. On the basis of the embodiment shown in FIG. 2, the step 210 may specifically include the following steps:

At step 302: acquiring a viewing distance, a field of view, and a view overlapping rate, and generating a Poisson sampling diameter.

Specifically, the viewing distance is the distance between the UAV and the target in the view along the line-of-sight. In an exemplary embodiment, the optimum viewing distance is 62.4 meters. The field of view is the field of the photographing device carried by the UAV, and is related to the hardware parameters of the photographing device. The view overlapping rate is the overlapping rate of two adjacent views. In an exemplary embodiment, the optimum value of the view overlapping rate is 0.85.

In an exemplary embodiment of the present disclosure, the relationship between the Poisson sampling diameter and the viewing distance, the field of view, and the view overlapping rate satisfies:

$$D_{disk}=2*d_{GSD}*\tan(\theta_{FOV}/2.0)*(1.0-\text{overla\_ratio})$$

$D_{disk}$ is the Poisson sampling diameter, $d_{GSD}$ is the viewing distance, $\theta_{FOV}$ is the field of view, and overla_ratio is the view overlapping rate.

At step 304: serving the initial model and the Poisson sampling diameter as inputs, generating a sampling point set by a Poisson distribution sampling algorithm; the sampling point set including a plurality of sampling points, each of the sampling points including a corresponding coordinate and a corresponding normal direction.

In an exemplary embodiment of the present disclosure, when the initial model is inputted into the Poisson sampling algorithm, the position and the normal direction of the model vertex of the initial model as well as the triangular patches of the model surface are obtained. Poisson sampling algorithm automatically generates approximately-uniformly distributed sampling points according to the inputted initial model and the Poisson sampling diameter. Each sampling point includes a corresponding coordinate and a normal direction.

At step 306: setting a view corresponding to each of the sampling points and determining an initial view set, each of the views is set on the normal direction of the corresponding sampling point, the viewing distance refers to a spacing between a coordinate of each of the views and the coordinate of the corresponding sampling point, and a direction of each of the views is opposite to the normal direction of the corresponding sampling point.

In an exemplary embodiment of the present disclosure, a corresponding view is set for each generated sampling point, and the obtained plurality of views are taken as an initial view set. Specifically, the sampling points in the sampling point set correspond to the views in the initial view set one by one, the distance between each sampling point and the corresponding view is the viewing distance. Each sampling point is opposite to the direction of the corresponding view, and the view is set on the normal direction of the corresponding sampling point.

According to the method for generating a UAV flight trajectory provided by an exemplary embodiment of the present disclosure, a sampling point set is generated by a Poisson sampling algorithm, and then the initial view set is generated. For the generated initial model, a uniformly distributed sampling point set can be obtained, and the initial view set corresponding to the uniformly distributed sampling point set can be obtained. In addition, the flight trajectory generated by the UAV according to the initial view set is more reasonable, thereby improving the data collection efficiency, reducing the outdoor operation time, and improving the operation efficiency.

Figure 4:
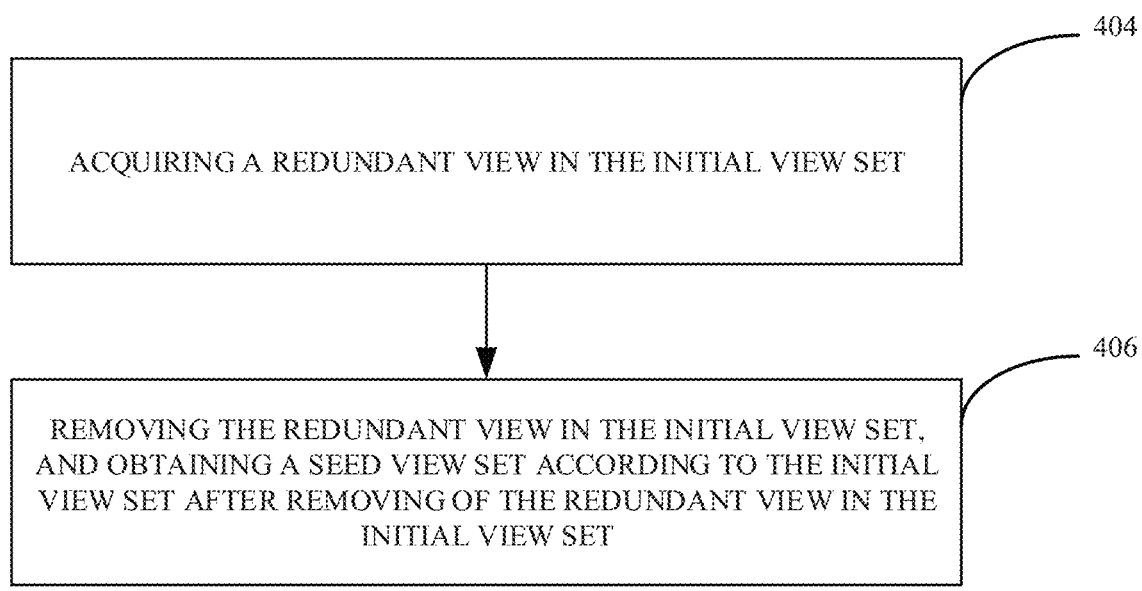
FIG. 4 is a flowchart of a method for generating a UAV flight trajectory according to an exemplary embodiment.

Referring to FIG. 4, a flowchart of a method for generating a UAV flight trajectory according to an exemplary embodiment is shown. It can be applied to the terminal 102 in the described implementation environment. On the basis of the embodiment shown in FIG. 3, after the step 306, the step 210 may further include the following steps:

At step 404: acquiring a redundant view in the initial view set.

At step 406: removing the redundant view in the initial view set, and obtaining a seed view set according to the initial view set after removing of the redundant view in the initial view set.

In an exemplary embodiment of the present disclosure, the resulting views corresponding to the sampling points are taken as the initial view set. For the initial view set, one view in which the redundancy is the highest is obtained and is removed from the initial view set. For the initial view set after removing, a view with the highest redundancy is calculated again, and removed until the initial view set after removing can just satisfy the data collection of the reconstruction operation for the to-be-reconstructed area, the initial view set with redundant views removed is defined as the seed view set.

According to the method for generating a UAV flight trajectory provided by exemplary embodiments of the present disclosure, the redundant collection processing of the to-be-reconstructed area is avoided by removing the redundant view, and the data collection efficiency is improved on the premise of ensuring the reconstruction quality. The outdoor operation time is reduced and the operation efficiency is improved.

Figure 5:
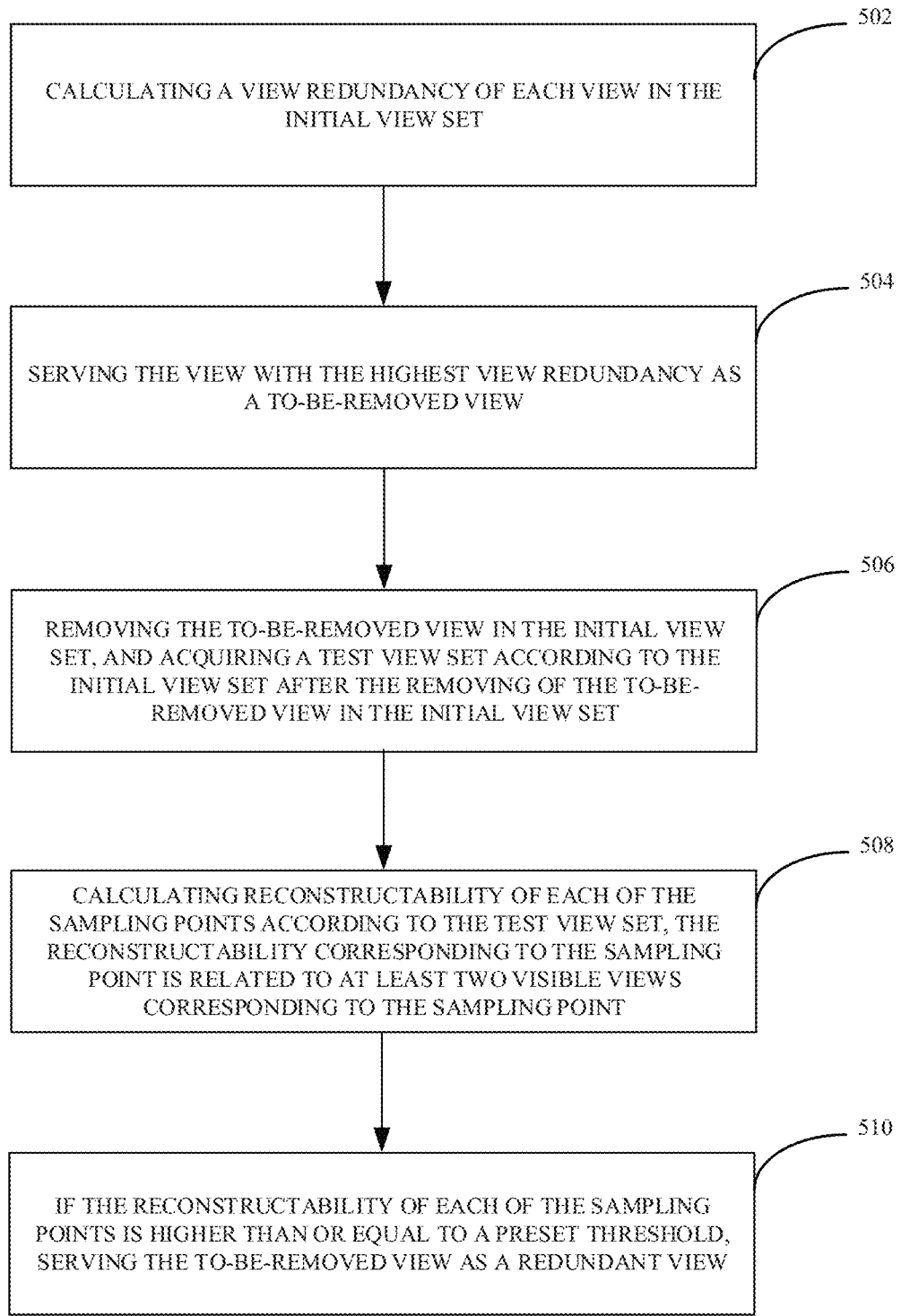
FIG. 5 is a flowchart of a method for generating a UAV flight trajectory according to an exemplary embodiment.

Referring to FIG. 5, a flowchart of a method for generating a UAV flight trajectory according to an exemplary embodiment is shown. It can be applied to the terminal 102 in the described implementation environment. On the basis of the embodiment shown in FIG. 4, the step 404 may specifically include the following steps:

At step 502: calculating a view redundancy of each view in the initial view set.

At step 504: serving the view with the highest view redundancy as a to-be-removed view.

In an exemplary embodiment of the present disclosure, since there is an overlap between the plurality of views configured according to the Poisson sampling algorithm, in each view, the UAV can photograph a sampling point corresponding to the view, while other views of the neighborhood may also capture this sampling point, meaning that each sampling point can be seen by at least two views and each view corresponds to at least one visible sampling point. The view redundancy of the view is related to the reconstructability of at least one visible sampling point corresponding to the view, and the magnitude of the reconstructability reflects the future reconstruction quality of the sampling point, i.e., the higher the reconstructability of the sampling point, the higher the future reconstruction quality.

In an exemplary embodiment of the present disclosure, the reconstructability of at least one visible sampling point is obtained based on the correspondence of the view to the at least one visible sampling point, and the minimum reconstructability is taken as the view redundancy of the view. Further, the view redundancy of each of the views in the initial view set is calculated and the view with the highest view redundancy is taken as the to-be-removed view.

At step 506: removing the to-be-removed view in the initial view set, and acquiring a test view set according to the initial view set after the removing of the to-be-removed view in the initial view set.

At step 508: calculating reconstructability of each of the sampling points according to the test view set, the reconstructability corresponding to the sampling point is related to at least two visible views corresponding to the sampling point.

In an exemplary embodiment of the present disclosure, since the test view set removed the to-be-removed view compared to the initial view set, the reconstructability of the sampling points of a portion of the sampling point set may be somewhat reduced. Therefore, the reconstructability of each sampling point needs to be recalculated according to the test view set.

At step 510: if the reconstructability of each of the sampling points is higher than or equal to a preset threshold, serving the to-be-removed view as a redundant view.

In an exemplary embodiment of the present disclosure, when the reconstructability of the sampling point is higher than or equal to a preset threshold, an area where the sampling point is located may be better reconstructed. After removing the to-be-removed view, if the above requirements are still satisfied, it is considered that the to-be-removed view can be removed as a redundant view.

According to a method for generating a UAV flight trajectory provided by an exemplary embodiment of the present disclosure, the redundant view is determined on the premise of ensuring the reconstruction quality of the area where each sampling point in the sampling point set is located. On the premise of ensuring the reconstruction quality of the to-be-reconstructed area, the redundant collection processing of the to-be-reconstructed area can be avoided, the data calculation and acquisition efficiency can be improved, the outdoor operation time can be reduced, and the operation efficiency can be improved.

Figure 6:
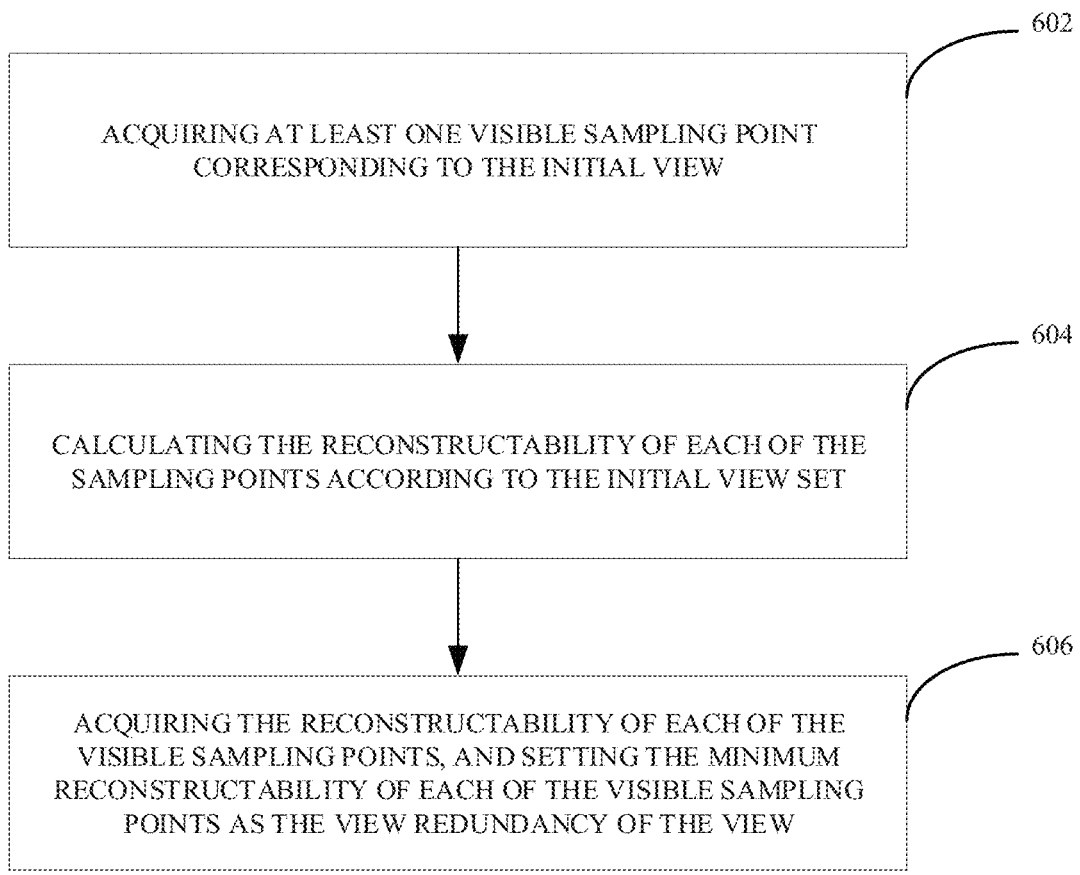
FIG. 6 is a flowchart of a method for generating a UAV flight trajectory according to an exemplary embodiment.

Referring to FIG. 6, a flowchart of a method for generating a UAV flight trajectory according to an exemplary embodiment is shown. It can be applied to the terminal 102 in the described implementation environment. On the basis of the embodiment shown in FIG. 5, the step 502 may specifically include the following steps:

At step 602: acquiring at least one visible sampling point corresponding to the view.

In an exemplary embodiment of the present disclosure, at least one sampling point that can be observed through the view is acquired, and the observable sampling point is taken as at least one visible sampling point corresponding to the view.

At step 604: calculating the reconstructability of each of the sampling points according to the initial view set.

Specifically, the reconstructability of each sampling point varies depending on the change in the view set. In an exemplary embodiment of the present disclosure, the reconstructability of each sampling point may be calculated from the views in the initial view set.

At step 606: acquiring the reconstructability of each of the visible sampling points, and setting the minimum reconstructability of each of the visible sampling points as the view redundancy of the view.

In an exemplary embodiment of the present disclosure, the reconstructability of each visible sampling point in step 602 may be obtained based on the reconstructability of each sampling point obtained in step 604. The view redundancy of this view is defined as the minimum reconstructability of each of the visible sampling points corresponding to this view.

In an exemplary embodiment of the present disclosure, the reconstructability corresponding to the sampling point is related to at least two visible views corresponding to the sampling point.

For example, if a sampling point is seen by a pair of views, i.e., the sampling point corresponds to two visible views, the reconstructability of the sampling point is defined as:

$$q(s,v_i,v_j)=w_1(\alpha)*w_2(d)*w_3(\alpha)*\cos\theta_m$$

Of which:

$$w_1(\alpha)=(1+\exp(-k_1*(\alpha-\alpha_1)))^{-1}$$

$$w_2(d)=1-\min(d/d_m,1)$$

$$w_3(\alpha)=1-(1+\exp(-k_3*(\alpha-\alpha_3)))^{-1}$$

$$\theta_m=\max(\theta_i,\theta_j)$$

According to the principle of the classical three-dimensional reconstruction algorithm, $w_1(\alpha)$ simulates the disparity dependence of the triangle measurement error, $w_2(d)$ simulates the influence of distance on the reconstructability, and $w_3(\alpha)$ measures the disparity dependence of the matching degree.

s is the sampling point, $v_i$ and $v_j$ are two visible views corresponding to the sampling point. $\alpha$ is the direction angle of the two visible views, $d_m$ is the maximum viewing distance as defined. d is the maximum of the distance from the two visible views to the sampling point. $\theta_1$ is an angle between the normal direction of the sampling point and the direction of the visible view $v_1$. $\theta_j$ is an angle between the normal direction of the sampling point and the direction of the visible view $v_j$. $k_1, \alpha_1, k_3, \alpha_3$ are adjustable parameters. In an exemplary embodiment, $$k_1=32,\ \alpha_1=\frac{\pi}{16},\ k_3=8,\ \alpha_3=\frac{\pi}{4}.$$

If a sampling point has at least two visible views, a sum of the reconstructability of the sampling point is defined as the sum of the actions under every two of all visible views:

$$h(s,U)=\sum_{\substack{i=1,\ldots,|U|\\j=i+1,\ldots,|U|}}\delta(s,v_i)\delta(s,v_j)q(s,v_i,v_j)$$

$\delta(s,v)$ is a binary function which is 1 if the view can see the sampling point, otherwise it is 0. That is, the reconstructability of the sampling point is the sum of the reconstructability under every two visible views. For example, if the sampling point corresponds to three visible views A, B, and C, the reconstructability of the sampling point is the sum of the reconstructability of the sampling point relative to the AB sampling point, the reconstructability of the sampling point relative to the BC sampling point, and the reconstructability of the sampling point relative to the AC sampling point.

Exemplary embodiments of the present disclosure also provide a method for generating a UAV flight trajectory that can be applied to the terminal 102 in the implementation environment described above. On the basis of the embodiments described above, after the above-mentioned step 406, the step 210 may further include the following steps:

performing a view replacement processing on the seed view set, and acquiring the view set according to the seed view set after the view replacement processing.

In an exemplary embodiment of the present disclosure, after removing processing is performed on the initial view set, a minimum initial view set may be obtained. In order to maximize the reconstructability of each sampling point in the sampling point set, the obtained initial view set after removing is defined as a seed view set centering on the seed view within the seed view set, searching for candidate views for various sub-views from the initial view set. For each seed view, the seed view is replaced with a candidate view, if the reconstructability sum of all sampling points can be increased, and the reconstructability of each sampling point is still higher than a preset threshold, i.e., the candidate view is considered to meet the requirements, and the seed view can be replaced. This processing does not change the number of views, but only increases the holistic reconstructability of all sampling points.

In an exemplary embodiment of the present disclosure, the preset threshold is defined as the reconstructability of sampling points under the action of three visible views uniformly distributed around the normal direction of the sampling points, and the direction angle between any two out of the three visible views is 15 degrees.

Figure 7:
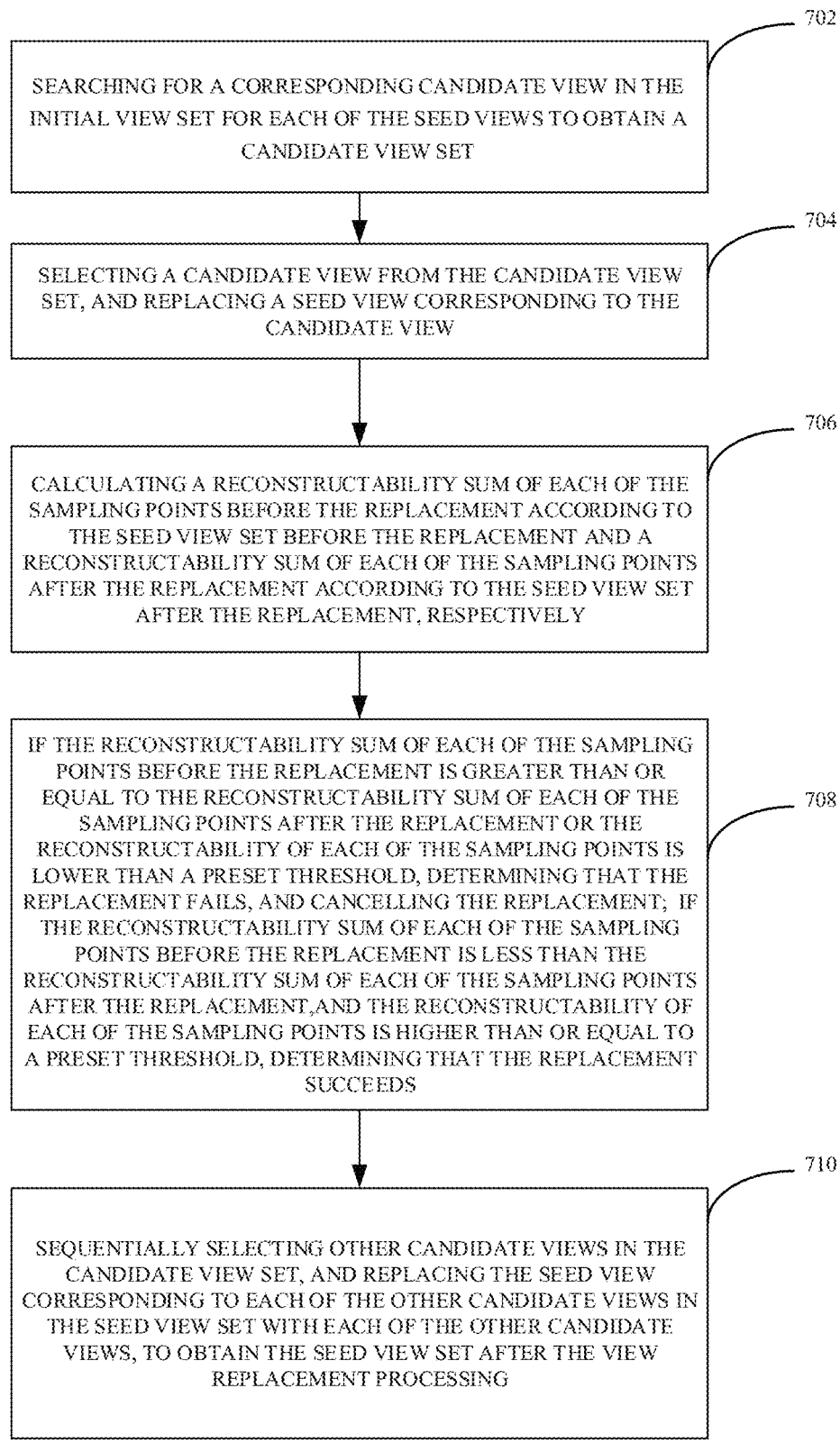
FIG. 7 is a flowchart of a method for generating a UAV flight trajectory according to an exemplary embodiment.

Specifically, referring to FIG. 7, a flowchart of a method for generating a UAV flight trajectory according to this embodiment is shown. The performing the view replacement processing on the seed view set after the removing processing to obtain the view set, including:

At step 702: searching for a corresponding candidate view in the initial view set for each of the seed views to obtain a candidate view set.

In an exemplary embodiment of the present disclosure, for each seed view, a candidate view corresponding to the seed view is searched in the initial view set. Specifically, a view in the initial view set which has the highest similarity to the seed view will be thought as a candidate view corresponding to the seed view.

Specifically, the degree of view similarity between the two views is defined as:

$$g(v_i, v_j) = \frac{o_i * o_j}{\|v_i v_j\| + \delta}$$

$o_i * o_j$ measures the similarity between the two view directions, $\|v_i v_j\|$ indicates the position spacing between the two views, $\delta$ is a small constant, to avoid the denominator from being 0.

At step 704: selecting a candidate view from the candidate view set, and replacing a seed view corresponding to the candidate view.

In an exemplary embodiment of the present disclosure, the processing of replacing the corresponding seed view with the candidate seed is performed sequentially, i.e., before the replacement processing of the previous candidate seed for its corresponding seed view is completed, other seed views in the seed view set remain unchanged.

At step 706: calculating a reconstructability sum of each of the sampling points before the replacement according to the seed view set before the replacement and a reconstructability sum of each of the sampling points after the replacement according to the seed view set after the replacement, respectively.

In an exemplary embodiment of the present disclosure, for each replacement process, before replacing the seed view corresponding to the candidate view in the seed view set with the candidate view, a sum of reconstructability of the sampling points before replacement is calculated. After replacing the seed view corresponding to the candidate view in the seed view set with the candidate view, the sum of the reconstructability of each sampling point after the replacement is calculated.

At step 708: if the reconstructability sum of each of the sampling points before the replacement is greater than or equal to the reconstructability sum of each of the sampling points after the replacement or the reconstructability of each of the sampling points is lower than a preset threshold, determining that the replacement fails, and cancelling the replacement; if the reconstructability sum of each of the sampling points before the replacement is less than the reconstructability sum of each of the sampling points after the replacement and the reconstructability of each of the sampling points is higher than or equal to a preset threshold, determining that the replacement succeeds.

In an exemplary embodiment of the present disclosure, the magnitude relationship between the sum of the reconstructability of each sampling point before the replacement and the sum of the reconstructability of each sampling point after the replacement is compared. If the reconstructability sum of each sampling point before replacement is smaller than the reconstructability sum of each sampling point after replacement and the reconstructability of each of the sampling points is higher than or equal to a preset threshold, it indicates that the reconstructability of each sampling point can be increased by the candidate view, and thus the replacement is considered successful. In the processing of performing the replacement of the next candidate view, the view replacement processing is performed on the basis of the seed view set after the replacement. Conversely, the replacement is determined to fail, and the replacement action is canceled, i.e., the candidate view in the replaced seed view is removed, and the seed view corresponding to the candidate view is re-added.

At step 710: sequentially selecting other candidate views in the candidate view set, and replacing the seed view corresponding to each of the other candidate views in the seed view set with each of the other candidate views, to obtain the seed view set after the view replacement processing.

In an exemplary embodiment of the present disclosure, after the corresponding view replacement processing is completed according to the previous candidate view, one candidate view is extracted from the other candidate views remaining in the candidate view set. The steps 704 through 708 are repeated until each candidate view in the candidate view set is retrieved. At this time, the primary view replacement processing for the seed view set has been completed, and the seed view set after the view replacement processing is obtained.

In an exemplary embodiment of the present disclosure, each candidate view in the candidate view set may be sequentially retrieved in a random order. In an exemplary embodiment of the present disclosure, a candidate view in the candidate view set may be sequentially retrieved in the order in which each candidate view is generated. In an exemplary embodiment of the present disclosure, each of the candidate views in the candidate view set may be sequentially extracted in order of the degree of similarity corresponding to each candidate view.

Exemplary embodiments of the present disclosure also provide a method for generating a UAV flight trajectory that can be applied to the terminal 102 in the implementation environment described above. On the basis of the described embodiment shown in FIG. 7, it may further include the following steps:

Repeating the view replacement processing on the seed view set until each of the candidate views fails to replace the corresponding seed view in the performing the view replacement processing on the seed view set.

In an exemplary embodiment of the present disclosure, after each sub-view is replaced by the corresponding candidate view, a seed view set after the view replacement processing is obtained, and the new seed view set after the view replacement processing is again subjected to view replacement operation, i.e., for each seed view in the seed view set after the view replacement process, steps 702 to 710 are repeated until each candidate view unsuccessfully replace the corresponding seed view in the step of view replacement operation.

In the method for generate a UAV flight trajectory provide by the exemplary embodiment of the present disclosure, the reconstructability of each sampling point can be greatly improved when the number of views is certain by repeating the view replacement operation for the seed view set. Therefore, on the premise of limited views, it still has higher reconstructability, effectively reducing the number of UAV flights, and saving the operation time in the field.

Figure 8:
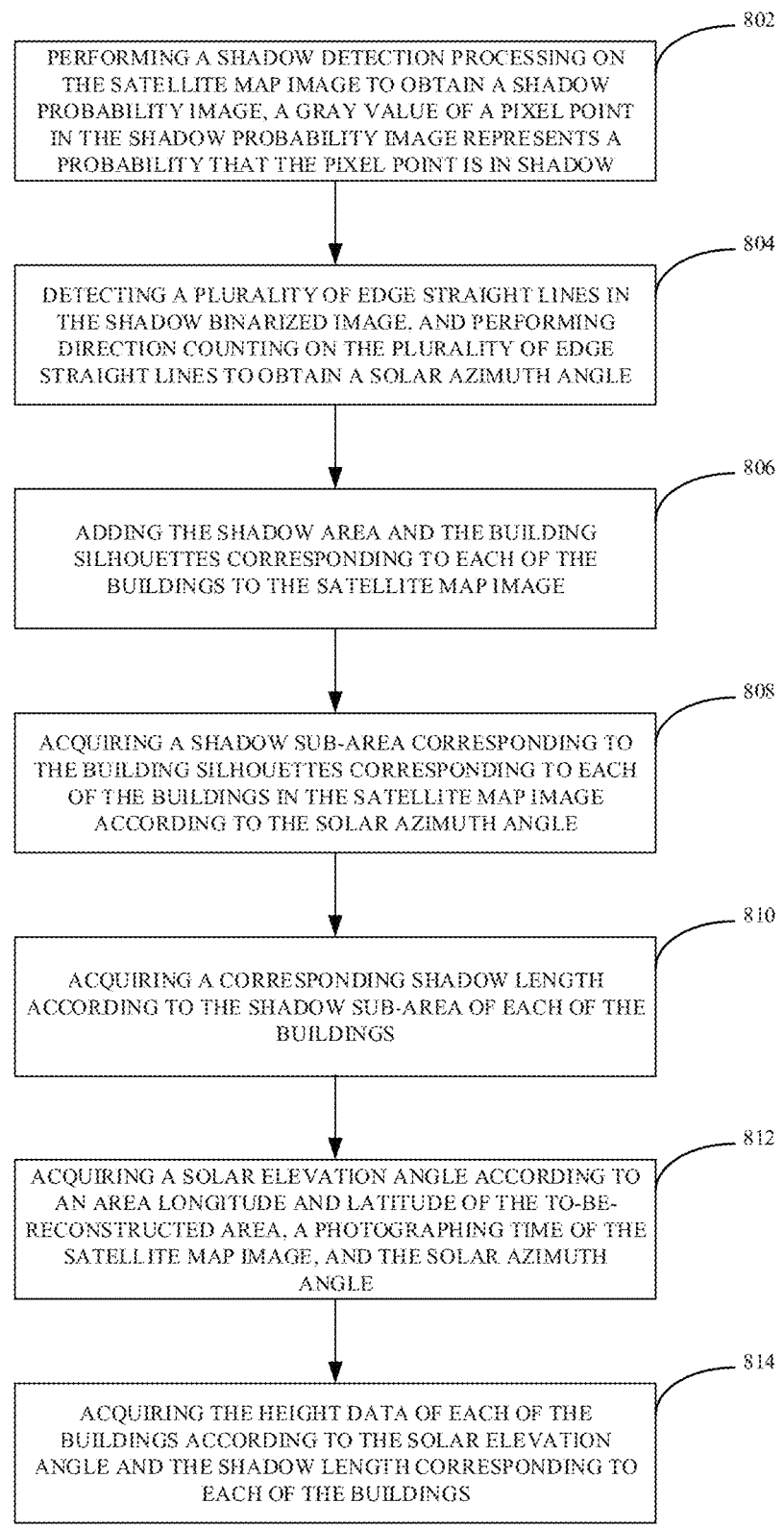
FIG. 8 is a flowchart of a method for generating a UAV flight trajectory according to an exemplary embodiment.

Referring to FIG. 8, a flowchart of a method for generating a UAV flight trajectory according to an exemplary embodiment is shown. It can be applied to the terminal 102 in the described implementation environment. On the basis of the embodiment shown in FIG. 2, the step 206 may specifically include the following steps:

At step 802: performing a shadow detection processing on the satellite map image to obtain a shadow probability image, a gray value of a pixel point in the shadow probability image represents a probability that the pixel point is in shadow.

In an exemplary embodiment of the present disclosure, referring to FIG. 9a, it shows a satellite map image of a to-be-reconstructed area, the satellite map image is subjected to shadow detection to obtain a shadow binarization map shown in FIG. 9b. The shadow binarization map is configured to display the shadow area in the satellite map image.

At step 804: detecting a plurality of edge straight lines in the shadow binarized image, and performing direction counting on the plurality of edge straight lines to obtain a solar azimuth angle.

In an exemplary embodiment of the present disclosure, the straight line in the binarized shading map can be detected by a Hough transform algorithm, and the direction of the straight line can be counted. Since the shading binarization map shown in FIG. 9b is configured to display the shaded area in the satellite map image, most of the directions are along the solar irradiation direction as a result of the straight line direction counting, therefore, the main direction of the statistical result is selected as the solar azimuth angle, as shown in FIG. 9c.

At step 806: adding the shadow area and the building silhouettes corresponding to each of the buildings to the satellite map image.

At step 808: acquiring a shadow sub-area corresponding to the building silhouettes corresponding to each of the buildings in the satellite map image according to the solar azimuth angle.

In an exemplary embodiment of the present disclosure, as shown in FIG. 9d, the silhouettes of each building obtained from the plane map image are added to the satellite map image, and, the shadow area in the obtained satellite map image is also added to the satellite map image, and the correspondence between each building and the shadow sub-area of the building can be obtained according to the solar azimuth angle.

At step 810: acquiring a corresponding shadow length according to the shadow sub-area of each of the buildings.

In an exemplary embodiment of the present disclosure, depending on a point on the building silhouette, extending in direction of the solar azimuth angle, the maximum line segment intersecting the shadow area corresponding to the building serves as the shadow length corresponding to the building.

At step 812: acquiring a solar elevation angle according to an area longitude and latitude of the to-be-reconstructed area, a photographing time of the satellite map image, and the solar azimuth angle.

In an exemplary embodiment of the present disclosure, the map data further includes the area longitude and latitude of the to-be-reconstructed area. Also, by way of the area longitude and latitude, the photographing time of the satellite map image, and a correspondence between the solar azimuth angle and the solar elevation angle, the solar elevation angle of the to-be-reconstructed area is obtained.

At step 814: acquiring the height data of each of the buildings according to the solar elevation angle and the shadow length corresponding to each of the buildings.

Specifically, the height data of the building satisfies the relationship:

$$H_b = L_s * \tan(\theta_{el})$$

$H_b$ is the height data of the building, $L_s$ is the shadow length, and $\theta_{el}$ is the solar elevation angle.

According to the method for generating a UAV flight trajectory provided by exemplary embodiments of the present disclosure, the height data of each building in the to-be-reconstructed area is obtained by analyzing and processing the plane map image and the satellite map image, the constructed initial model can reflect the structure distribution and shape of the to-be-reconstructed area to a large extent, which makes the flight trajectory determined by the model more reasonable.

Referring to FIG. 10, a flowchart of a method for generating a UAV flight trajectory according to an exemplary embodiment is shown, which can be applied to the terminal 102 in the described implementation environment. On the basis of the embodiment shown in FIG. 8, step 802 may specifically include the following steps:

At step 902: performing a shadow detection processing on the satellite map image to obtain a shadow probability image, a gray value of a pixel point in the shadow probability image represents a probability that the pixel point is in shadow.

Figure 11A:
FIGS. 11a-11d are schematic views of map images provided by some exemplary embodiments.
Figure 11B:

In an exemplary embodiment of the present disclosure, referring to FIG. 11a, which shows a satellite map image of a to-be-reconstructed area, and a shadow probability image shown in FIG. 11b can be obtained by performing a shadow detection processing on the satellite map image. The gray value of the pixel point in the shadow probability image is configured to characterize the probability that the pixel point is in shadow, i.e., the darker the color, the greater the probability that the pixel point is a shadow.

At step 904: performing an area segmentation processing on the satellite map image to obtain an area segmentation image.

Figure 11C:

In an exemplary embodiment of the present disclosure, an area segmentation image as shown in FIG. 11c can be obtained by area segmentation of the satellite map image using a mean shift algorithm, the area segmentation image includes a plurality of segmented areas. The colors filled in each of the segmented areas are different.

At step 906: acquiring a shadow binarized image according to the area segmentation image and the shadow probability image, the shadow binarized image displaying a shadow area in the satellite map image.

Figure 11D:
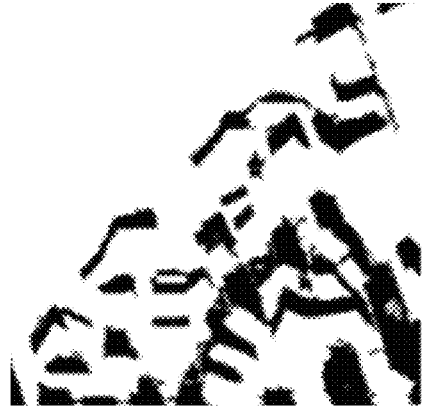

In an exemplary embodiment of the present disclosure, a shadow probability value corresponding to each pixel point in each segmented area in the segmented image is acquired. If the number of pixels having a shadow probability greater than 0.2 in the segmented area is equal to or greater than 70% of the total number of pixels in the segmented area, the segmented area is marked as a shadow area to obtain a shadow binarized image as shown in FIG. 11d.

According to a method for generating a UAV flight trajectory provided by an exemplary embodiment of the present disclosure, a shadow probability image and an area segmentation image of a satellite map image are obtained and a shadow binary image is obtained, the resulting shadow binarized image more accurately reflects the position and size of the shadow area in the satellite map image, thereby making the height data of each building obtained from the shadow area more accurate.

Exemplary embodiments of the present disclosure also provide a method for generating a UAV flight trajectory that can be applied to the terminal 102 in the implementation environment described above. On the basis of the embodiments described above, the following steps may also be included:

In the initial model, pre-rendering is performed in combination with the initial view set and the sampling point set to obtain a visible relationship between the initial view set and the sampling point set; the visible relationship includes a corresponding relationship between each of the views and at least one visible sampling point; the visible sampling point is a sampling point that can be observed by the UAV under the view; the visible relationship further includes a corresponding relationship between each sampling point and at least one visible view; the visible view is a view when the sampling point can be observed by the UAV.

According to the method for generating a UAV flight trajectory provided in this embodiment, the corresponding relationship between each of the views and at least one visible sampling point can be obtained, and the corresponding relationship between the sampling point and at least one visible view can also be obtained. Furthermore, the computational workload can be reduced and the computational efficiency can be improved in the subsequent calculation of the view redundancy and the reconstructability of the sampling points.

Exemplary embodiments of the present disclosure also provide a method for generating a UAV flight trajectory that can be applied to the terminal 102 in the implementation environment described above. On the basis of the embodiments described above, the above-mentioned step 212 may specifically include the following steps:

acquiring a flight path cost function; generating the flight trajectory according to the view set, the flight path cost function, and the travelling salesman problem algorithm.

In an exemplary embodiment of the present disclosure, the flight path cost function is preset in the terminal 102, and a flight trajectory with the least cost can be generated according to the view set, the flight path cost function, and the travelling salesman problem algorithm.

Specifically, the flight path cost function is related to a shortest distance and a view orientation changing between two views in the view set. The flight path cost function may be defined as:

$$e(v_i, v_j) = l(v_i, v_j)\exp\left(\frac{\alpha}{l(v_i, v_j)}\right)$$

$\alpha$ is the view orientation changing between the two views, $l(v_i,v_j)$ is the shortest distance between the two views in the safe area.

Through the method for generating a UAV flight trajectory provided in this embodiment, a reasonable and efficient flight trajectory can be obtained by the travelling salesman problem algorithm according to the flight cost function.

Figure 12:
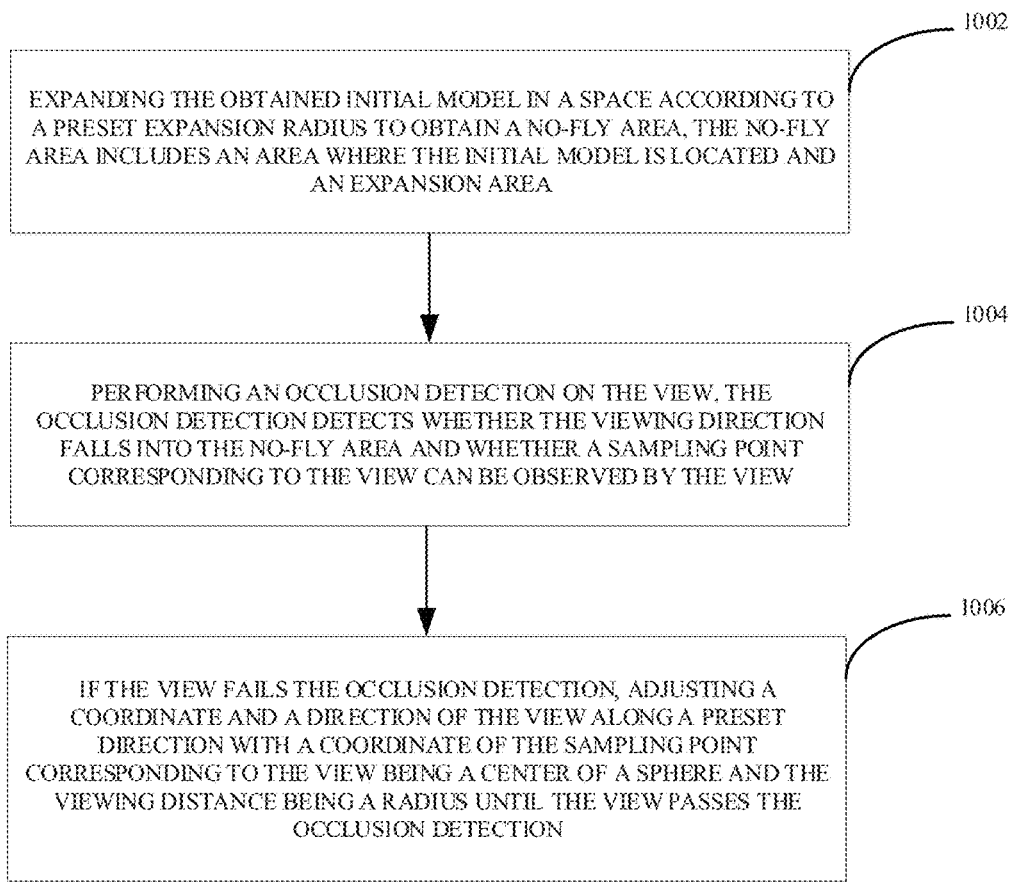
FIG. 12 is a flowchart of a method for generating a UAV flight trajectory according to an exemplary embodiment.

Referring to FIG. 12, a flowchart of a method for generating a UAV flight trajectory according to an exemplary embodiment is shown, which can be applied to the terminal 102 in the described implementation environment. On the basis of the described embodiment shown in FIG. 2, it may further include the following steps:

At step 1002: expanding the obtained initial model in a space according to a preset expansion radius to obtain a no-fly area, the no-fly area includes an area where the initial model is located and an expansion area.

Figure 13A:
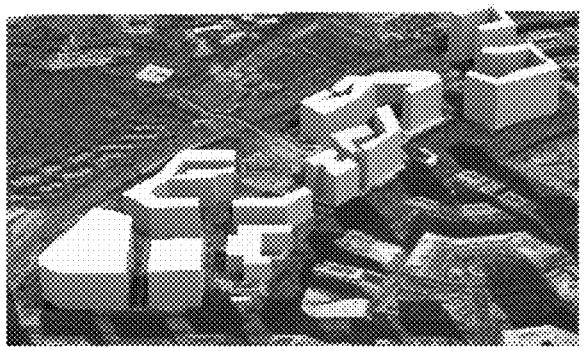
FIGS. 13a-13b are schematic diagrams for providing a three-dimensional model according to an exemplary embodiment.
Figure 13B:
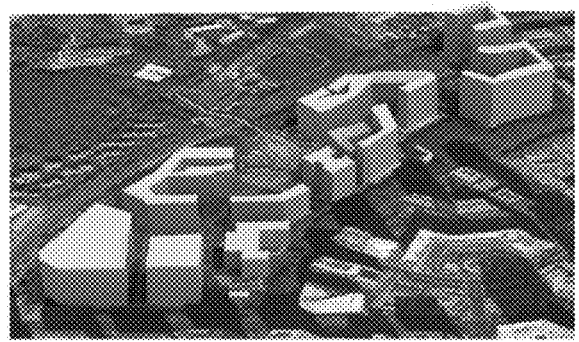

In an exemplary embodiment of the present disclosure, referring to FIG. 13a, which shows an initial model corresponding to a to-be-reconstructed area, and the initial model is expanded according to a preset expansion radius to obtain an expanded three-dimensional model as shown in FIG. 13b. The white object is the area where the building is located in the initial model, and the dark object is the expansion area after the building is expanded, and the no-fly area is set as the area where the initial model is located and the expansion area. In an exemplary embodiment, the preset expansion radius can be set to 20 meters.

In an exemplary embodiment of the present disclosure, the no-fly area may be updated by adding a no-fly height. Particularly, the minimum flying height of the UAV may be 35 meters, and the maximum flying height may be 120 meters according to the UAV flight control regulations, i.e., in the three-dimensional space, an area where the height is less than 35 meters or more than 120 meters is also set as a no-fly area.

At step 1004: performing an occlusion detection on the view, the occlusion detection detects whether the view falls into the no-fly area and whether a sampling point corresponding to the view can be observed by the view.

Figure 14A:
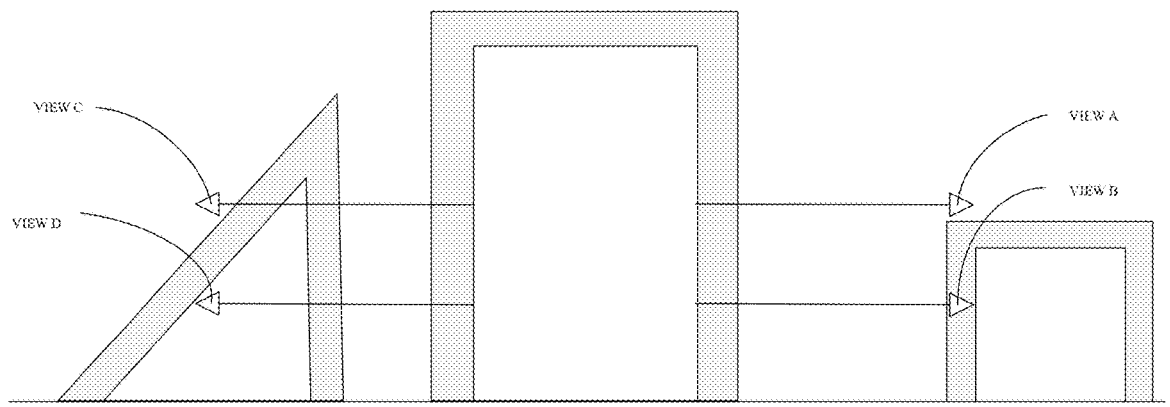
FIGS. 14a-14b are schematic diagrams for providing view adjustment according to an exemplary embodiment.

Specifically, referring to FIG. 14a, a schematic diagram of a no-fly area is shown. The view A passes the occlusion detection. The view B, the view C, and the view D all fail the occlusion detection. The view B fails the occlusion detection due to falling into the expansion area in the no-fly area, and the view C fails the occlusion detection because the corresponding sampling point cannot be observed by the view. The view D fails the occlusion detection due to falling into the building area of the no-fly area. Generally, the view fails the occlusion detection when the view falls into the no-fly area, or, the sampling point corresponding to the view cannot be observed by the view. The view passes the occlusion detection when the view does not fall into the no-fly area and the sampling point corresponding to the view can be observed by the view.

At step 1006: if the view fails the occlusion detection, adjusting a coordinate and a direction of the view along a preset direction with a coordinate of the sampling point corresponding to the view being a center of a sphere and the viewing distance being a radius until the view passes the occlusion detection.

Figure 14B:
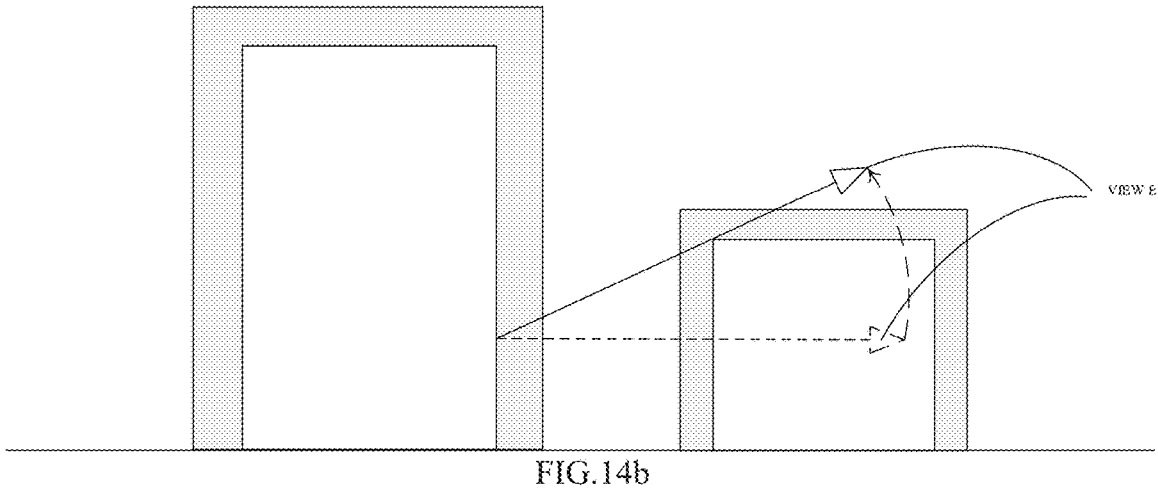

In an exemplary embodiment of the present disclosure, the preset direction is a direction toward the Z axis, referring to FIG. 14b, which shows a schematic view of the view adjustment processing. The view E fails the occlusion detection, and the coordinate of the sampling point corresponding to the view E is the spherical center. The viewing distance is the radius, and the coordinate and the normal direction of the view E are adjusted along the direction toward the Z axis, and when it is determined that the adjusted view E can pass the occlusion detection, the adjustment is stopped, and the current coordinate and the normal direction of the view E are saved.

It should be understood that although the steps in the described flowcharts are sequentially displayed as indicated by the arrows, these steps are not necessarily sequentially performed in the order indicated by the arrows. Unless expressly stated herein, the execution of these steps is not strictly sequence limited, and these steps may be performed in other sequences. Moreover, at least a portion of the steps in the flowcharts described above may include a plurality of sub-steps or a plurality of stages, which are not necessarily performed at the same time, but may be performed at different times. The order of execution of these sub-steps or stages is also not necessarily sequential, but may be performed in turn or alternately with at least a portion of the sub-steps or stages of other steps or other steps.

Figure 15:
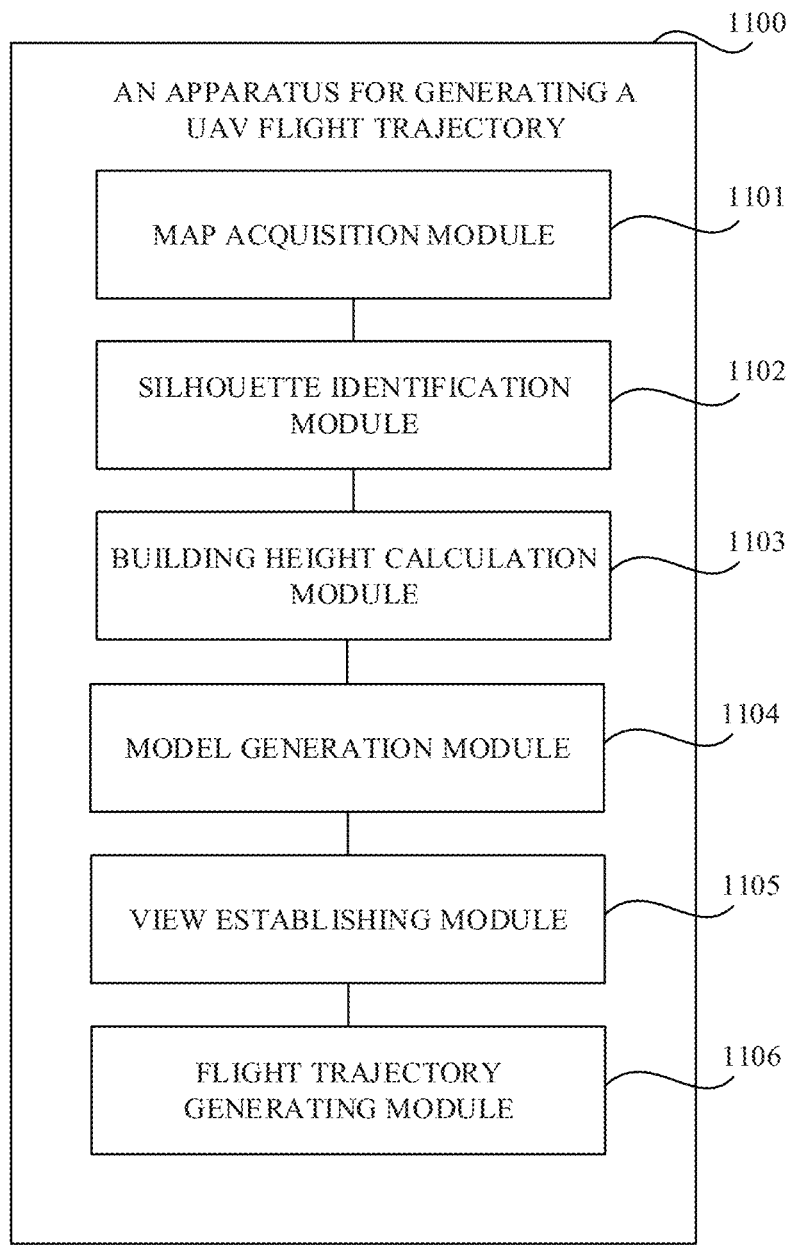
FIG. 15 is a block diagram of an apparatus for generating a UAV flight trajectory according to an exemplary embodiment.

Referring to FIG. 15, a block diagram of an apparatus 1100 for generating a UAV flight trajectory according to an exemplary embodiment of the present disclosure is shown. As shown in FIG. 15, the apparatus 1100 for generating a UAV flight trajectory may include: a map acquisition module 1101, a silhouette identification module 1102, a building height calculation module 1103, a model generation module 1104, a view establishing module 1105, and a flight trajectory generating module 1106.

The map acquisition module 1101 is configured to acquire map data of a to-be-reconstructed area. The map data includes a satellite map image and a plane map image.

The silhouette identification module 1102 is configured to acquire building silhouettes corresponding to each of the buildings in the to-be-reconstructed area according to the plane map image.

The building height calculation module 1103 is configured to acquire height data corresponding to each of the buildings according to the satellite map image.

The model generation module 1104 is configured to generate an initial model according to the building silhouettes and the height data corresponding to each of the buildings.

The view establishing module 1105 is configured to determine a view set according to the initial model. The view set includes a plurality of views when a UAV photographs the to-be-reconstructed area.

The flight trajectory generating module 1106 is configured to generate a flight trajectory according to the view set.

In an exemplary embodiment of the present disclosure, the view establishing module 1105 is specifically configured to acquire a viewing distance, a field of view, and a view overlapping rate, and serve the initial model and the Poisson sampling diameter as inputs, generate a sampling point set by a Poisson distribution sampling algorithm, the sampling point set includes a plurality of sampling points, each of the sampling points includes a corresponding coordinate and a corresponding normal direction; and set a view corresponding to each of the sampling points and determine the initial view set, each of the views is set on the normal direction of the corresponding sampling point, the viewing distance refers to a spacing between a coordinate of each of the views and the coordinate of the corresponding sampling point, and a direction of each of the views is opposite to the normal direction of the corresponding sampling point.

In an exemplary embodiment of the present disclosure, the view establishing module 1105 is further configured to acquire a redundant view in the initial view set; and remove the redundant view in the initial view set, and obtain the seed view set according to the initial view set after removing the redundant view in the initial view set.

In an exemplary embodiment of the present disclosure, the view establishing module 1105 is further configured to calculate a view redundancy of each view in the initial view set; serve the view with the highest view redundancy as a to-be-removed view; remove the to-be-removed view in the initial view set, and obtain a test view set according to the initial view set after removing the to-be-removed view in the initial view set; calculate reconstructability of each of the sampling points according to the test view set, the reconstructability corresponding to the sampling point is related to at least two visible views corresponding to the sampling point; and if the reconstructability of each of the sampling points is higher than or equal to a preset threshold, serve the to-be-removed view as a redundant view.

In an exemplary embodiment of the present disclosure, the view establishing module 1105 is further configured to acquire at least one visible sampling point corresponding to the view; calculate the reconstructability of each of the sampling points according to the initial view set; and acquire the reconstructability of each of the visible sampling points, and set the minimum reconstructability of each of the visible sampling points as the view redundancy of the view.

In an exemplary embodiment of the present disclosure, the reconstructability corresponding to the sampling point is related to at least two visible views corresponding to the sampling point.

In an exemplary embodiment of the present disclosure, the view establishing module 1105 is further configured to perform a view replacement processing on the seed view set, and acquire the view set according to the seed view set after the view replacement processing; the performing view replacement processing on the seed view set includes searching for a corresponding candidate view in the initial view set for each of the seed views to obtain a candidate view set; selecting a candidate view from the candidate view set, and replacing a seed view corresponding to the candidate view in the seed view set with the candidate view; calculating a reconstructability sum of each of the sampling points before the replacement according to the seed view set before the replacement and a reconstructability sum of each of the sampling points after the replacement according to the seed view set after the replacement, respectively; if the reconstructability sum of each of the sampling points before the replacement is greater than or equal to the reconstructability sum of each of the sampling points after the replacement or the reconstructability of each of the sampling points is lower than a preset threshold, determining that the replacement fails, and cancelling the replacement; if the reconstructability sum of each of the sampling points before the replacement is less than the reconstructability sum of each of the sampling points after the replacement and the reconstructability of each of the sampling points is higher than or equal to a preset threshold, determining that the replacement successes; sequentially selecting other candidate views in the candidate view set, and replacing the seed view corresponding to each of the other candidate views in the seed view set with each of the other candidate views, to obtain the new seed view set after the view replacement processing.

In an exemplary embodiment of the present disclosure, the view establishing module 1105 is further configured to repeat the view replacement processing on the seed view set until each of the candidate views fails to replace the corresponding seed view in the performing the view replacement processing on the seed view set.

In an exemplary embodiment of the present disclosure, the building height calculation module 1103 is specifically configured to acquire a shadow binarization map from the satellite map image, the shadow binarization map is configured to display a shadow area in the satellite map image; detect a plurality of edge straight lines in the shadow binarized image, and perform direction counting on the plurality of edge straight lines to obtain a solar azimuth angle; add the shaded area and each of the building silhouettes to the satellite map image; acquire a shadow sub-area corresponding to each of the building silhouettes in the satellite map image according to the solar azimuth angle; acquire a corresponding shadow length according to a shadow sub-area of each of the buildings; acquire a solar elevation according to an area longitude and latitude of the to-be-reconstructed area, a photographing time of the satellite map image, and the solar azimuth angle; and acquire the height data of each of the buildings according to the solar elevation angle and the shadow length corresponding to each of the buildings.

In an exemplary embodiment of the present disclosure, the building height calculation module 1103 is further configured to perform shadow detection processing on the satellite map image to obtain a shadow probability image, a gray value of the pixel point in the shadow probability image is configured to represent the probability that the pixel point is in shadow; perform area segmentation processing on the satellite map image to obtain an area segmentation image; and acquire the shadow binarized image from the area segmentation image and the shadow probability image.

In an exemplary embodiment of the present disclosure, the flight trajectory generation module 1106 is further configured to acquire a flight path cost function; generate the flight trajectory according to the view set, the flight path cost function, and a travelling salesman problem algorithm.

In an exemplary embodiment of the present disclosure, the flight path cost function is related to a shortest distance and a view orientation changing between two views in the view set.

Figure 16:
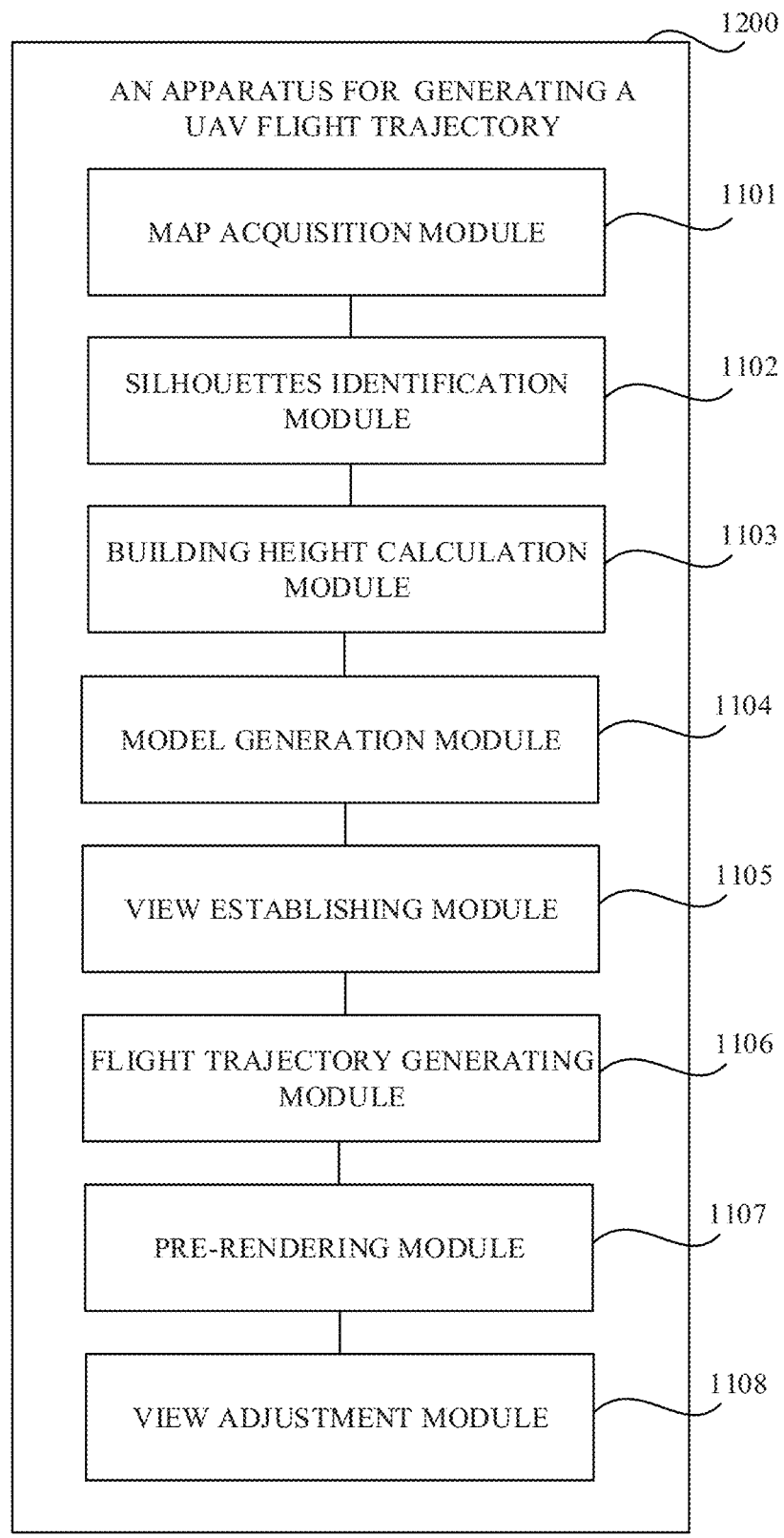
FIG. 16 is a block diagram of an apparatus for generating a UAV flight trajectory according to an exemplary embodiment.

Referring to FIG. 16, a block diagram of an apparatus 1200 for generating a UAV flight trajectory according to an exemplary embodiment of the present disclosure is shown. As shown in FIG. 16, in addition to each module included in the apparatus 1100 for generating a UAV flight trajectory, the apparatus 1200 for generating a UAV flight trajectory may optionally includes: a pre-rendering module 1107 and a view adjustment module 1108.

The pre-rendering module 1107 is configured to perform pre-rendering in the initial model in combination with the initial view set and the sampling point set to obtain a visible relationship between the initial view set and the sampling point set; the visible relationship includes a corresponding relationship between each of the views and at least one visible sampling point; the visible sampling point is a sampling point that can be observed by the UAV under the view; and the visible relationship further includes a corresponding relationship between each sampling point and at least one visible view, the visible view is a view when the sampling point can be observed by the UAV.

The view adjustment module 1108 is configured to expand the obtained initial model according to a preset expansion radius in a space to obtain a no-fly area, the no-fly area includes an area where the initial model is located and an expansion area; perform occlusion detection on the view, the occlusion detection is configured to detect whether the view falls into the no-fly area and/or whether the view can see a corresponding sampling point; if the view fails the occlusion detection, the coordinate and direction of the view are adjusted along a preset direction with the sampling point coordinate corresponding to the view being the center of the sphere and the viewing distance being the radius until the view passes the occlusion detection.

The specific limitations of an apparatus for generating a UAV flight trajectory can be referred to the limitations of a method for generating a UAV flight trajectory as described above and are omitted for brevity. All or part of each module in the apparatus for generating a UAV flight trajectory may be implemented by software, hardware, and combinations thereof. The above modules may be embedded in or independent of a processor in a computer apparatus in the form of hardware, or may be stored in a memory in the computer apparatus in the form of software so that the processor calls to perform the operations corresponding to the above modules.

Figure 17:
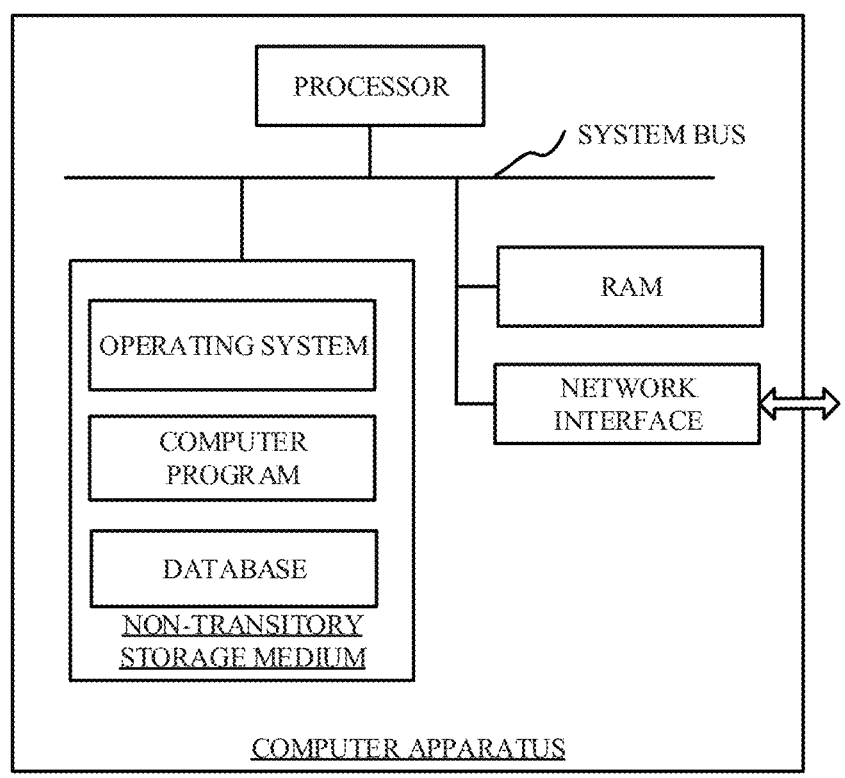
FIG. 17 is a block diagram of a computer apparatus provided by an exemplary embodiment.

In an exemplary embodiment, a computer apparatus is provided, which may be a terminal, the internal structural diagram of which may be as shown in FIG. 17. The computer apparatus includes a processor, a memory, a network interface, a display screen, and an input device connected through a system bus. The processor of the computer apparatus is configured to provide computing and control capabilities. The memory of the computer apparatus includes a non-volatile storage medium, a Random Access Memory (RAM). The non-volatile storage medium stores an operating system and a computer program. The RAM provides an environment for the operation of the operating system and the computer programs in the non-volatile storage medium. The network interface of the computer apparatus is configured to communicate with an external terminal through a network connection. The computer program is executed by a processor to implement a method for generating a UAV flight trajectory. The display screen of the computer apparatus may be a liquid crystal display screen or an electronic ink display screen, and the input device of the computer apparatus may be a touch layer covered on the display screen, or may be a key, a trackball or a touch pad provided on a housing of the computer apparatus, It can also be an external keyboard, touch pad or mouse.

It will be understood by those skilled in the art that the structures shown in FIG. 17 are merely a block diagram of a portion of the structures associated with the present disclosure and do not constitute a limitation on the computer apparatus to which the present disclosure applies. A particular computer apparatus may include more or fewer components than shown in the drawings, or combine certain components, or have a different arrangement of components.

In an exemplary embodiment, a computer apparatus includes: one or more processors, and a memory storing computer-readable instructions which, when executed by the one or more processors cause the one or more processors to perform steps of:

acquiring map data of a to-be-reconstructed area, the map data comprising a satellite map image and a plane map image;

acquiring building silhouettes corresponding to each of buildings in the to-be-reconstructed area according to the plane map image;

acquiring height data corresponding to each of the buildings according to the satellite map image;

generating an initial model according to the building silhouettes and the height data corresponding to each of the buildings;

determining a view set according to the initial model, the view set comprising a plurality of views when a UAV photographs the to-be-reconstructed area; and generating a flight trajectory according to the view set.

In an exemplary embodiment, a non-transitory computer-readable storage medium storing computer-executable instructions that, when executed by one or more processors, cause the one or more processors to perform the steps of:

acquiring map data of a to-be-reconstructed area, the map data comprising a satellite map image and a plane map image;

acquiring building silhouettes corresponding to each of the buildings in the to-be-reconstructed area according to the plane map image;

acquiring height data corresponding to each of the buildings according to the satellite map image;

generating an initial model according to the building silhouettes and the height data corresponding to each of the buildings;

determining a view set according to the initial model, the view set comprising a plurality of views when a UAV photographs the to-be-reconstructed area; and generating a flight trajectory according to the view set.

Persons of ordinary skill in the art understand that all or part of the processes in the methods of the foregoing embodiments may be implemented by a computer program instructing relevant hardware. The computer program may be stored in a non-transitory computer-readable storage medium. When the computer program is executed, flows of embodiments of the methods as described above may be included. Any references to memory, storage, databases, or other media used in the various embodiments provided herein may include non-transitory and/or transitory memory. The non-transitory memory may include a read-only memory (ROM), a programmable ROM (PROM), an electrically programmable ROM (EPROM), an electrically erasable programmable ROM (EEPROM), or a flash memory.

The transitory memory may include a random access memory (RANI) or an external cache memory. By way of illustration and not limitation, RANI is available in a variety of forms such as static RANI (SRANI), dynamic RAM (DRAM), synchronous DRAM (SDRAM), double data rate SDRANI (DDRSDRAM), enhanced SDRAM (ESDRANI), Synchlink DRAM (SLDRAM), Memory Bus (Rambus) Direct RAM (RDRAM), Direct Memory Bus Dynamic RAM (DRDRAM), Memory Bus Dynamic RAM (RDRAM) etc.

The various embodiments can be implemented, in part or as a whole, by software, hardware or the combinations thereof. The foregoing methods can be performed by modules embedded in or independent from a processor of a base station and in the form of hardware, or be stored in a memory of a base station and in the form of software, so as to facilitate the processor to call and execute corresponding steps of the foregoing various modules. The processor can be a central processing unit (CPU), a microprocessor, a micro-controller unit, and so on.

A person skilled in the art should understand that the processes of the methods in the above embodiments can be, in full or in part, implemented by computer programs instructing underlying hardware, the programs can be stored in a non-volatile computer-readable storage medium, the program can include the processes in the embodiments of the various methods when it is being executed. The storage medium can be a disk, a CD, a Read-Only Memory (ROM).

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method for generating an unmanned aerial vehicle (UAV) flight trajectory, comprising:
acquiring map data of a to-be-reconstructed area, the map data comprising a satellite map image and a plane map image, wherein, according to the plane map image, buildings are located in the to-be-reconstructed area;
acquiring building silhouettes corresponding to each of the buildings in the to-be-reconstructed area according to the plane map image;
acquiring height data corresponding to each of the buildings according to the satellite map image;
generating an initial model according to the building silhouettes and the height data corresponding to each of the buildings;
determining a determined view set according to the initial model, the determined view set comprising a plurality of determined views for use when a UAV photographs the to-be-reconstructed area; and
generating a flight trajectory according to the determined view set;

wherein the determining the determined view set according to the initial model comprises:
acquiring a viewing distance, a field of view, and a view overlapping rate, and generating a Poisson sampling diameter;
serving the initial model and the Poisson sampling diameter as inputs, generating a sampling point set by a Poisson distribution sampling algorithm, the sampling point set comprising a plurality of sampling points each of the sampling points comprising a corresponding coordinate and a corresponding normal direction; and
setting an initial view corresponding to each of the sampling points and thereby determining an initial view set, wherein each of the initial views in the initial view set is set on the normal direction of the corresponding sampling point, and wherein the viewing distance refers to a spacing between a coordinate of each of the initial views and the coordinate of the corresponding sampling point, and a direction of each of the initial views is opposite to the normal direction of the corresponding sampling point.

2. The method according to claim 1, wherein after the setting the initial view corresponding to each of the sampling points and thereby determining the initial view set, the determining the determined view set according to the initial model further comprises:
acquiring a redundant view in the initial view set; and
removing the redundant view in the initial view set, and obtaining a seed view set according to the initial view set after removing the redundant view in the initial view set.

3. The method according to claim 2, wherein the acquiring the redundant view in the initial view set comprises:
calculating a view redundancy of each initial view in the initial view set;
serving the initial view with the highest view redundancy as a to-be-removed view;
removing the to-be-removed view in the initial view set, and obtaining a test view set according to the initial view set after removing the to-be-removed view in the initial view set;
calculating reconstructability of each of the sampling points according to the test view set, wherein the reconstructability corresponding to the sampling point is related to at least two visible views corresponding to the sampling point; and
if the reconstructability of each of the sampling points is higher than or equal to a preset threshold, serving the to-be-removed view as a redundant view.

4. The method according to claim 3, wherein the calculating the view redundancy of each initial view in the initial view set comprises:
acquiring at least one visible sampling point corresponding to the initial view;
calculating the reconstructability of each of the sampling points according to the initial view set; and
acquiring the reconstructability of each visible sampling point of the at least one visible sampling point, and setting the minimum reconstructability of each visible sampling point of the at least one visible sampling point as the view redundancy of the initial view.

5. The method according to claim 2, wherein after obtaining the seed view set according to the initial view set after removing the redundant view in the initial view set, the determining the determined view set according to the initial model further comprises:

performing a view replacement processing on the seed view set, and acquiring the determined view set according to the seed view set after the view replacement processing.

6. The method according to claim 5, wherein the performing the view replacement processing on the seed view set comprises:
searching for a corresponding candidate view in the initial view set for each of the seed views to obtain a candidate view set;
selecting a candidate view from the candidate view set, and replacing a seed view corresponding to the candidate view;
calculating a reconstructability sum of each of the sampling points before the replacement according to the seed view set before the replacement and a reconstructability sum of each of the sampling points after the replacement according to the seed view set after the replacement, respectively;
if the reconstructability sum of each of the sampling points before the replacement is greater than or equal to the reconstructability sum of each of the sampling points after the replacement or the reconstructability of each of the sampling points is lower than a preset threshold, determining that the replacement fails, and canceling the replacement;
if the reconstructability sum of each of the sampling points before the replacement is less than the reconstructability sum of each of the sampling points after the replacement and the reconstructability of each of the sampling points is higher than or equal to a preset threshold, determining that the replacement successes;
sequentially selecting other candidate views in the candidate view set, and replacing the seed view corresponding to each of the other candidate views in the seed view set with each of the other candidate views, to obtain the seed view set after the view replacement processing; and
repeating the view replacement processing on the seed view set until each of the candidate views fails to replace the corresponding seed view in the performing the view replacement processing on the seed view set.

7. The method according to claim 1, wherein the acquiring the height data corresponding to each of the buildings according to the satellite map image comprises:
performing a shadow detection processing on the satellite map image to obtain a shadow probability image, wherein a gray value of a pixel point in the shadow probability image represents a probability that the pixel point is in shadow;
performing an area segmentation processing on the satellite map image to obtain an area segmentation image;
acquiring a shadow binarized image according to the area segmentation image and the shadow probability image, the shadow binarized image displaying a shadow area in the satellite map image;
detecting a plurality of edge straight lines in the shadow binarized image, and performing direction counting on the plurality of edge straight lines to obtain a solar azimuth angle;
adding the shadow area and the building silhouettes corresponding to each of the buildings to the satellite map image;
acquiring a shadow sub-area corresponding to the building silhouettes corresponding to each of the buildings in the satellite map image according to the solar azimuth angle;

acquiring a corresponding shadow length according to the shadow sub-area of each of the buildings;

acquiring a solar elevation angle according to an area longitude and latitude of the to-be-reconstructed area, a photographing time of the satellite map image, and the solar azimuth angle; and acquiring the height data of each of the buildings according to the solar elevation angle and the shadow length corresponding to each of the buildings.

8. The method according to claim 2, further comprising:

in the initial model, performing a pre-rendering processing with the initial view set and the sampling point set to obtain a visible relationship between the initial view set and the sampling point set;

for each of the initial views: the visible relationship comprising a corresponding relationship between the initial view and at least one visible sampling point, the at least one visible sampling point being at least one sampling point that can be observed by the UAV under the initial view; and for each sampling point of the at least one sampling point: the visible relationship comprising a corresponding relationship between the sampling point and at least one visible view, the at least one visible view being at least one initial view in the initial view set, wherein the sampling point can be observed by the UAV for the at least one initial view in the initial view set.

9. The method according to claim 1, wherein the generating the flight trajectory according to the determined view set comprises:

acquiring a flight path cost function, the flight path cost function is related to the shortest distance and a view orientation changing between two views in the determined view set; and generating the flight trajectory according to the determined view set, the flight path cost function, and a travelling salesman problem algorithm.

10. The method according to claim 1, the determining the determined view set comprising:

expanding the obtained initial model in a space according to a preset expansion radius to obtain a no-fly area, wherein the no-fly area comprises an area where the initial model is located and an expansion area;

for each view in the initial view set or for each view in the seed view set;

performing an occlusion detection on the view, wherein the occlusion detection detects whether the view falls into the no-fly area and whether a sampling point corresponding to the view can be observed by the view;

determining that the view fails the occlusion detection when the view falls into the no-fly area, or, the sampling point corresponding to the view cannot be observed by the view;

determining that the view passes the occlusion detection when the view does not fall into the no-fly area and the sampling point corresponding to the view can be observed by the view; and if the view fails the occlusion detection, adjusting a coordinate and a direction of the view along a preset direction with a coordinate of the sampling point corresponding to the view being a center of a sphere and the viewing distance being a radius until the view passes the occlusion detection.

11. A computer apparatus, comprising: one or more processors, and a memory storing computer-readable instructions configured so that, when executed by the one or more processors, the computer-readable instructions cause the one or more processors to perform steps of:

acquiring map data of a to-be-reconstructed area, the map data comprising a satellite map image and a plane map image, wherein, according to the plane map image, buildings are located in the to-be-reconstructed area;

acquiring building silhouettes corresponding to each of the buildings in the to-be-reconstructed area according to the plane map image;

acquiring height data corresponding to each of the buildings according to the satellite map image;

generating an initial model according to the building silhouettes and the height data corresponding to each of the buildings;

determining a determined view set according to the initial model, the determined view set comprising a plurality of determined views for use when a UAV photographs the to-be-reconstructed area; and generating a flight trajectory according to the determined view set;

wherein, the determining the determined view set according to the initial model comprises:

acquiring a viewing distance, a field of view, and a view overlapping rate, and generating a Poisson sampling diameter;

serving the initial model and the Poisson sampling diameter as inputs, generating a sampling point set by a Poisson distribution sampling algorithm, the sampling point set comprising a plurality of sampling points, each of the sampling points comprising a corresponding coordinate and a corresponding normal direction; and setting an initial view corresponding to each of the sampling points and thereby determining the initial view set, wherein each of the initial views in the initial view set is set on the normal direction of the corresponding sampling point, and wherein the viewing distance refers to a spacing between a coordinate of each of the initial views and the coordinate of the corresponding sampling point, and a direction of each of the initial views is opposite to the normal direction of the corresponding sampling point.

12. The computer apparatus according to claim 11, wherein after the setting the initial view corresponding to each of the sampling points and thereby determining the initial view set, the determining the determined view set according to the initial model further comprises:

acquiring a redundant view in the initial view set; and removing the redundant view in the initial view set, and acquiring a seed view set according to the initial view set after removing the redundant view in the initial view set.

13. The computer apparatus according to claim 12, wherein the acquiring the redundant view in the initial view set comprises:

calculating a view redundancy of each view in the initial view set;

serving the initial view with the highest view redundancy as a to-be-removed view;

removing the to-be-removed view in the initial view set, and acquiring a test view set according to the initial view set after removing the to-be-removed view in the initial view set;

calculating reconstructability of each of the sampling points according to the test view set, wherein the reconstructability corresponding to the sampling point is related to at least two visible views corresponding to the sampling point; and if the reconstructability of each of the sampling points is higher than or equal to a preset threshold, serving the to-be-removed view as a redundant view.

14. A storage system comprising at least one non-transitory computer-readable storage medium, the at least one non-transitory computer-readable storage medium storing computer-executable instructions configured so that, when executed by one or more processors, the computer-executable instructions cause the one or more processors to perform the steps of:

acquiring map data of a to-be-reconstructed area, the map data comprising a satellite map image and a plane map image;

acquiring building silhouettes corresponding to each of the buildings in the to-be-reconstructed area according to the plane map image, wherein, according to the plane map image, buildings are located in the to-be-reconstructed area;

acquiring height data corresponding to each of the buildings according to the satellite map image;

generating an initial model according to the building silhouettes and the height data corresponding to each of the buildings;

determining a determined view set according to the initial model, the determined view set comprising a plurality of determined views for use when a UAV photographs the to-be-reconstructed area; and generating a flight trajectory according to the determined view set, wherein, the determining the determined view set according to the initial model comprises:

acquiring a viewing distance, a field of view, and a view overlapping rate, and generating a Poisson sampling diameter;

serving the initial model and the Poisson sampling diameter as inputs, generating a sampling point set by a Poisson distribution sampling algorithm, the sampling point set comprising a plurality of sampling points, each of the sampling points comprising a corresponding coordinate and a corresponding normal direction; and setting an initial view corresponding to each of the sampling points and thereby determining the initial view set, wherein each of the initial views in the initial view set is set on the normal direction of the corresponding sampling point, and wherein the viewing distance refers to a spacing between a coordinate of each of the initial views and the coordinate of the corresponding sampling point, and a direction of each of the initial views is opposite to the normal direction of the corresponding sampling point.

15. The storage system according to claim 14, wherein after the setting the initial view corresponding to each of the sampling points and thereby determining the initial view set, the determining the determined view set according to the initial model further comprises:

acquiring a redundant view in the initial view set; and removing the redundant view in the initial view set, and acquiring a seed view set according to the initial view set after removing the redundant view in the initial view set.

16. The storage system according to claim 15, wherein the acquiring the redundant view in the initial view set comprises:

calculating a view redundancy of each initial view in the initial view set;

serving the initial view with the highest view redundancy as a to-be-removed view;

removing the to-be-removed view in the initial view set, and acquiring a test view set according to the initial view set after removing the to-be-removed view in the initial view set;

calculating reconstructability of each of the sampling points according to the test view set, wherein the reconstructability corresponding to the sampling point is related to at least two visible views corresponding to the sampling point; and if the reconstructability of each of the sampling points is higher than or equal to a preset threshold, serving the to-be-removed view as a redundant view.

17. The storage system according to claim 14, wherein the acquiring the height data corresponding to each of the buildings according to the satellite map image comprises:

performing a shadow detection processing on the satellite map image to obtain a shadow probability image, wherein a gray value of a pixel point in the shadow probability image represents a probability that the pixel point is in shadow;

performing an area segmentation processing on the satellite map image to obtain an area segmentation image;

acquiring a shadow binarized image according to the area segmentation image and the shadow probability image, the shadow binarized image displaying a shadow area in the satellite map image;

detecting a plurality of edge straight lines in the shadow binarized image, and performing direction counting on the plurality of edge straight lines to obtain a solar azimuth angle;

adding the shadow area and the building silhouettes corresponding to each of the buildings to the satellite map image;

acquiring a shadow sub-area corresponding to the building silhouettes corresponding to each of the buildings in the satellite map image according to the solar azimuth angle;

acquiring a corresponding shadow length according to the shadow sub-area of each of the buildings;

acquiring a solar elevation angle according to an area longitude and latitude of the to-be-reconstructed area, a photographing time of the satellite map image, and the solar azimuth angle; and acquiring the height data of each of the buildings according to the solar elevation angle and the shadow length corresponding to each of the buildings.

* * * * *